United States Patent
Hoshino et al.

(10) Patent No.: US 9,075,255 B2
(45) Date of Patent: Jul. 7, 2015

(54) DISPLAY DEVICE

(71) Applicant: Sony Corporation, Tokyo (JP)

(72) Inventors: Norifumi Hoshino, Tokyo (JP);
Yoshihisa Sato, Saitama (JP); Yutaka Imai, Tokyo (JP)

(73) Assignee: Sony Corporation, Tokyo (JP)

( * ) Notice: Subject to any disclaimer, the term of this patent is extended or adjusted under 35 U.S.C. 154(b) by 161 days.

(21) Appl. No.: 13/716,710

(22) Filed: Dec. 17, 2012

(65) Prior Publication Data

US 2013/0176511 A1 Jul. 11, 2013

(30) Foreign Application Priority Data

Jan. 5, 2012 (JP) .................................. 2012-000623

(51) Int. Cl.
*G02F 1/1335* (2006.01)
*G02F 1/13* (2006.01)
*G02B 27/22* (2006.01)

(52) U.S. Cl.
CPC .......... *G02F 1/1313* (2013.01); *G02B 27/2214* (2013.01)

(58) Field of Classification Search
CPC ........................... G02B 27/2214; G02F 1/1313
USPC ............................. 349/15, 122; 345/5, 6, 419; 257/E21.002
See application file for complete search history.

(56) References Cited

U.S. PATENT DOCUMENTS

| 5,315,377 | A  | * | 5/1994 | Isono et al. ...................... 348/51 |
| 6,040,807 | A  | * | 3/2000 | Hamagishi et al. ............... 345/6 |
| 7,567,307 | B2 | * | 7/2009 | Kim et al. ........................ 349/15 |
| 8,154,800 | B2 | * | 4/2012 | Kean et al. ..................... 359/464 |
| 2002/0001128 | A1 | * | 1/2002 | Moseley et al. ................ 359/465 |
| 2007/0046564 | A1 | * | 3/2007 | Kim et al. ......................... 345/6 |
| 2007/0046777 | A1 | * | 3/2007 | Song et al. ..................... 348/56 |
| 2008/0137012 | A1 | * | 6/2008 | Louwsma ..................... 349/106 |
| 2009/0096943 | A1 | * | 4/2009 | Uehara et al. .................... 349/37 |
| 2009/0141225 | A1 | * | 6/2009 | Park et al. ..................... 349/122 |
| 2009/0225243 | A1 | * | 9/2009 | Kim et al. ........................ 349/15 |
| 2011/0157495 | A1 | * | 6/2011 | Kim et al. ........................ 349/15 |
| 2011/0199549 | A1 | * | 8/2011 | Washizawa ..................... 349/15 |
| 2012/0140130 | A1 | * | 6/2012 | Yanai ............................. 349/15 |

FOREIGN PATENT DOCUMENTS

| CN | 1912704 | * | 2/2007 | ............. G02B 27/22 |
| DE | EP 2437098 | * | 4/2012 | ............. G02B 27/22 |
| JP | 2005-086056 A |   | 3/2005 | |

* cited by examiner

*Primary Examiner* — Sang V Nguyen
(74) *Attorney, Agent, or Firm* — Wolf, Greenfield & Sacks, P.C.

(57) ABSTRACT

There is provided a display device including a transmissive display panel composed of pixels arranged in a form of a two-dimensional matrix in a first direction and a second direction different from the first direction, a planar illumination device for illuminating the transmissive display panel from a rear surface thereof, and a parallax barrier disposed between the transmissive display panel and the planar illumination device, for dividing an image displayed on the transmissive display panel into images for multiple viewpoints.

9 Claims, 25 Drawing Sheets

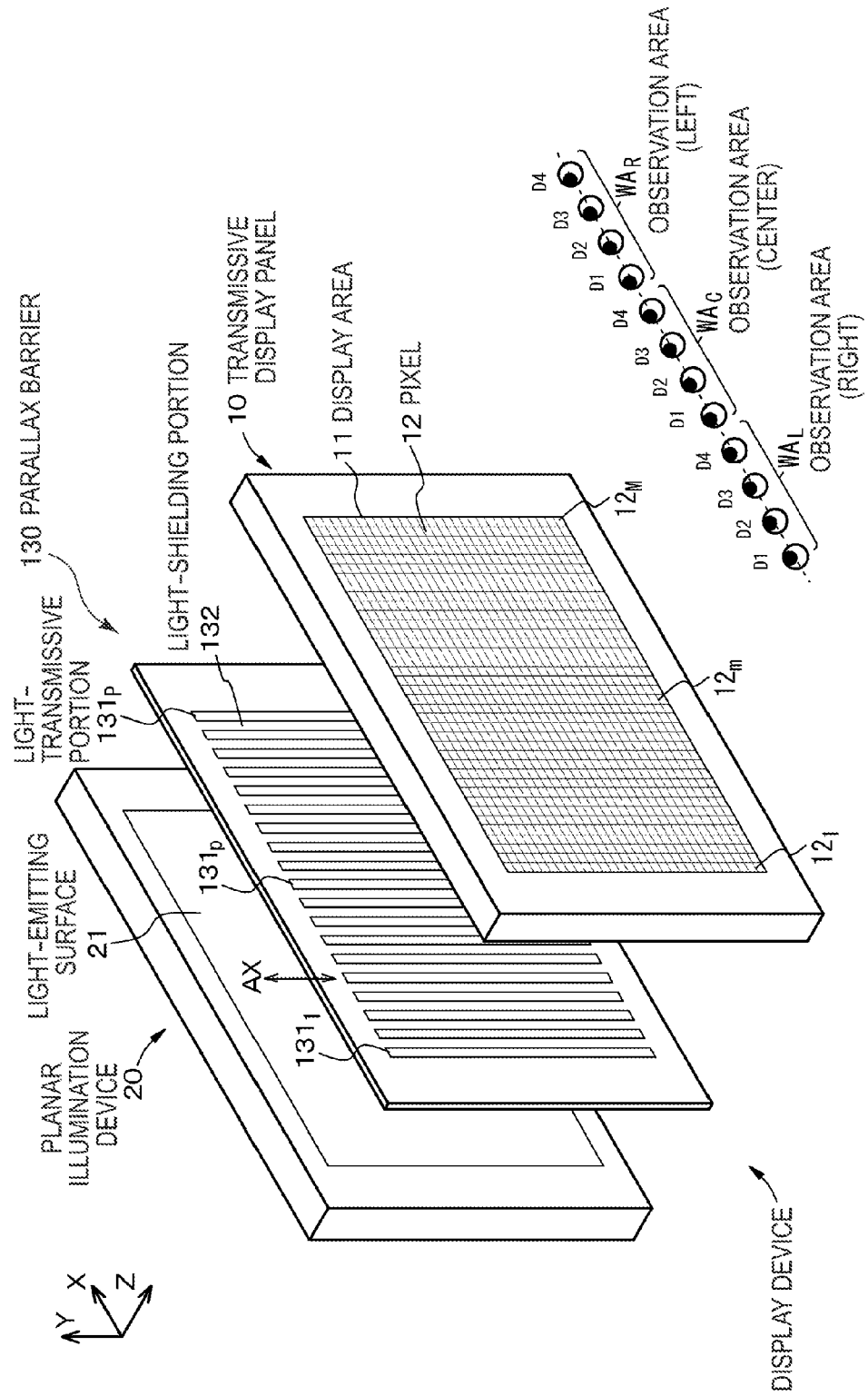

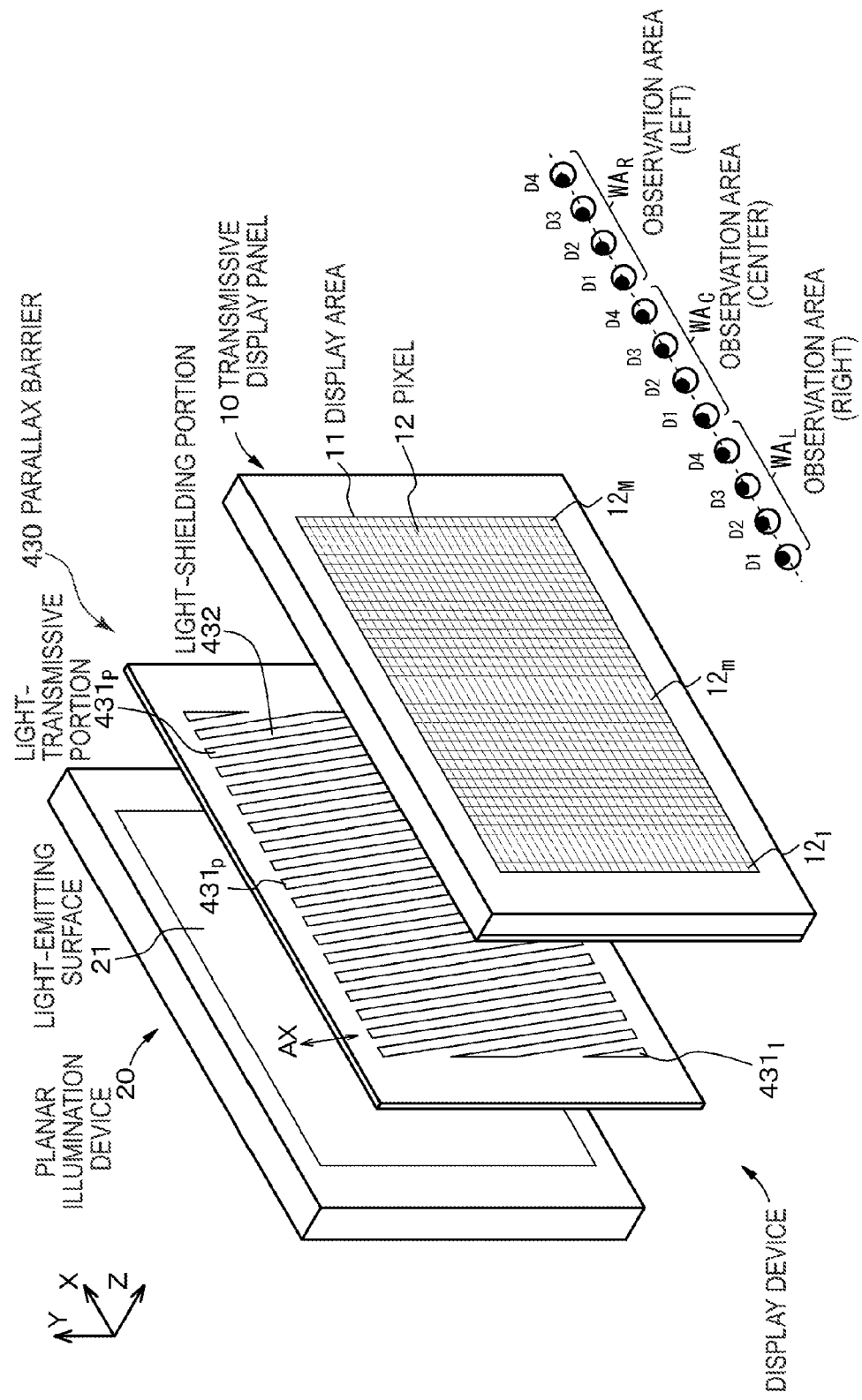

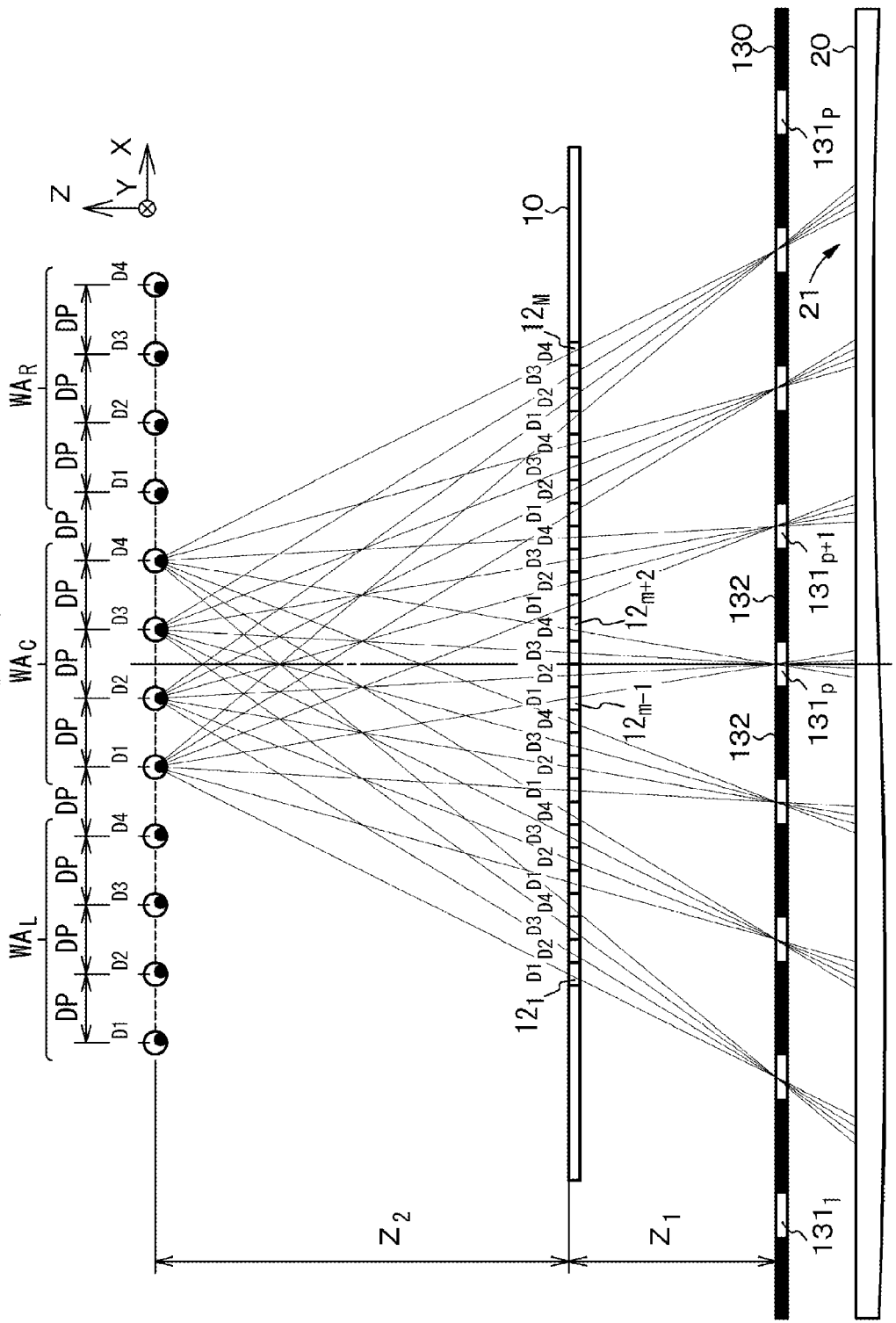

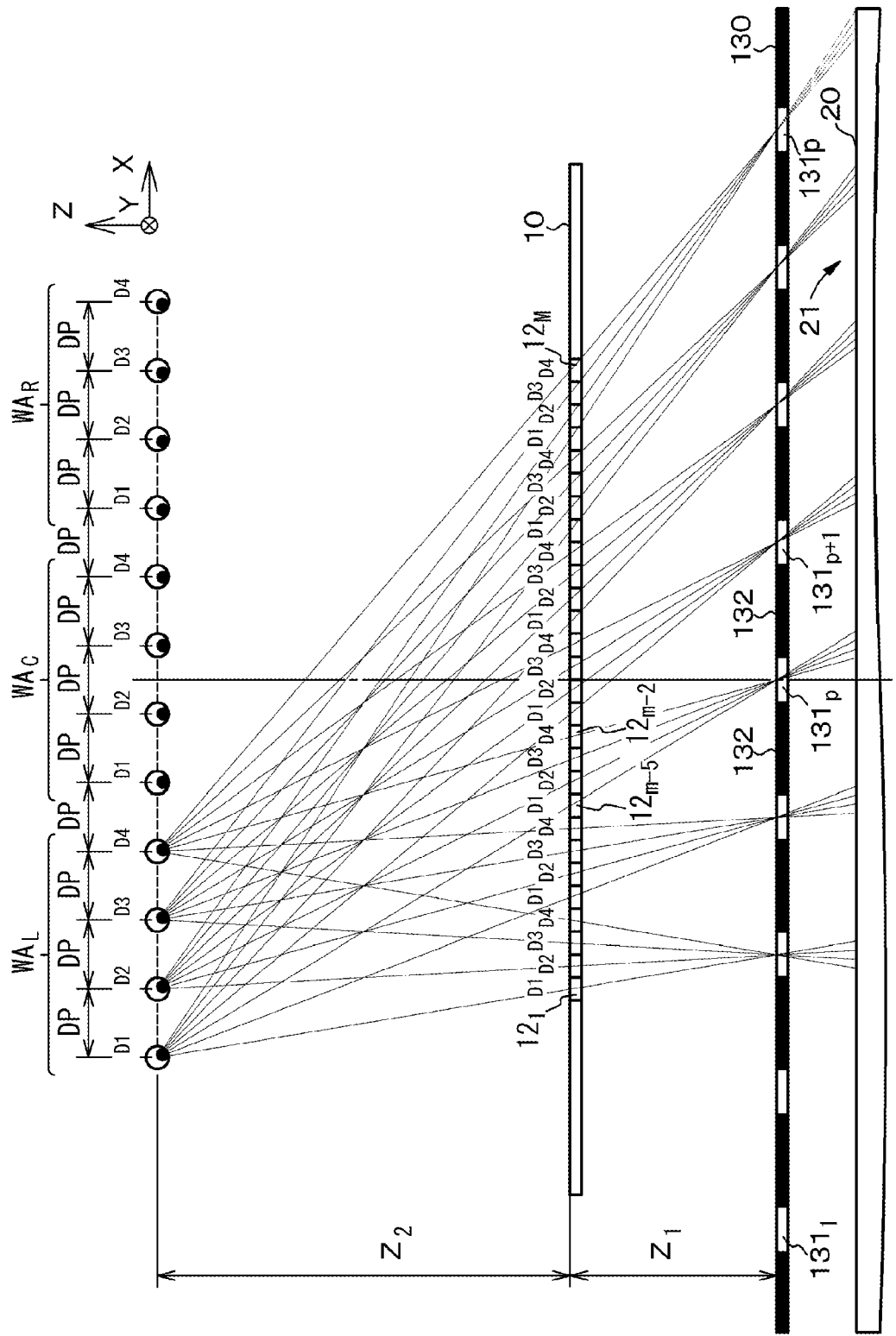

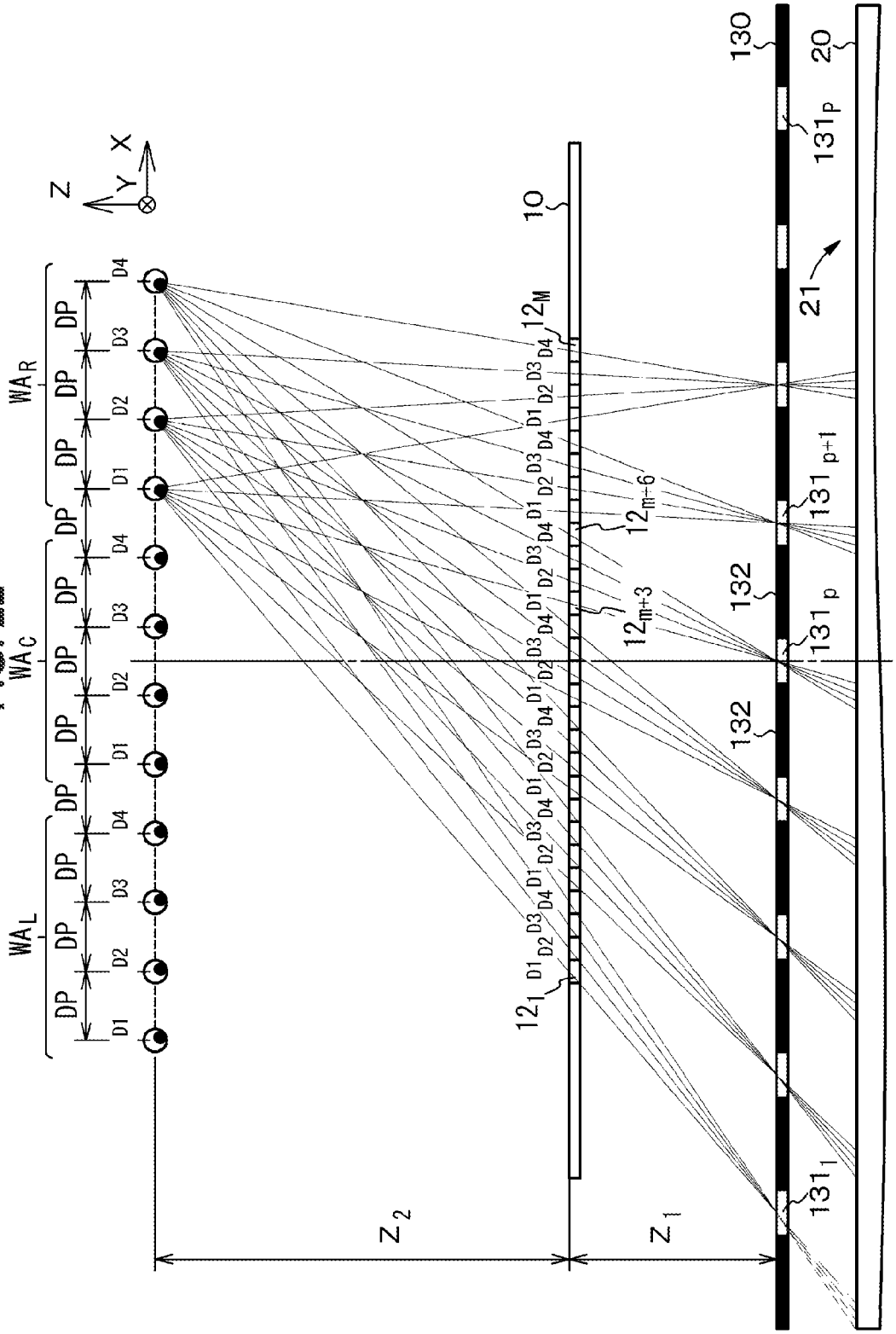

DISPLAY DEVICE

CROSS REFERENCE TO RELATED APPLICATIONS

This application claims priority to Japanese Priority Patent Application JP 2012-000623, filed in the Japan Patent Office on Jan. 5, 2012, the entire content of which is hereby incorporated by reference.

BACKGROUND

The present disclosure relates to display devices, and more particularly, to a display device capable of displaying a so-called naked-eye stereoscopic image.

A variety of stereoscopic image display devices that realize a stereoscopic view by allowing a viewer to observe two images with parallax have been known from the related art. Methods employed in the stereoscopic image display devices are largely classified into two categories: a glasses method in which a parallax image is separately input to the viewer's respective left and right eyes through his glasses, and a naked-eye method (glasses-free system) in which a parallax image is input to both the left and right eyes without using glasses. As an example of the naked-eye stereoscopic image display devices, a lenticular stereoscopic image display device and a parallax barrier stereoscopic image display device are being put into practical use. The lenticular stereoscopic image display device includes a transmissive display panel (two-dimensional image display device) in combination with a lenticular lens. The parallax barrier stereoscopic image display device includes a transmissive display panel in combination with a parallax barrier.

The parallax barrier stereoscopic image display device typically includes a transmissive display panel and a parallax barrier (for example, see Japanese Patent Application Laid-Open Publication No. 2005-086056). Specifically, the transmissive display panel has a plurality of pixels arranged in the horizontal direction (lateral direction) and vertical direction (longitudinal direction) to form a two-directional matrix pattern. The parallax barrier has a plurality of light-transmissive portions and light-shielding portions extending generally in the vertical direction to be juxtaposed alternately in the horizontal direction. The transmissive display panel is often composed of liquid crystal display devices and is illuminated by a planar illumination device from its back face, and each pixel operates as a type of an optical shutter. When a color display is performed on the transmissive display panel, one pixel is typically composed of a plurality of sub-pixels, each sub-pixel being surrounded by black matrix.

However, the light-transmissive portions of the parallax barrier and the black matrix of the transmissive display panel have their respective regular repeated patterns. Thus, moire may occur when the parallax barrier and the transmissive display panel are juxtaposed. FIG. 25 illustrates a photograph showing a state where the moire is occurred in a display device in the related art. The moire can be classified into two categories: a moire caused by the shape of light-transmissive portion in the parallax barrier and the shape of black matrix in the transmissive display panel (hereinafter referred to as "shape-induced moire" for convenience), and a moire caused by the diffraction of light (hereinafter referred to as "diffraction-induced moire" for convenience).

The cause why the shape-induced moire is occurred will be explained with reference to FIGS. 23A, 23B, 24A and 24B which schematically illustrate an arrangement relationship between the transmissive display panel and the parallax barrier. Note that in these figures the transmissive display panel and the parallax barrier are illustrated to be overlapped with each other for convenience. Further, narrow cross-hatched lines slanting from top left to bottom right are drawn on an area where a light-transmissive portion 131 or 531 in the parallax barrier is projected onto the transmissive display panel. Furthermore, intermediate-sized cross-hatched lines slanting from top right to bottom left are drawn on an area where a light-shielding portion 132 or 532 in the parallax barrier is projected onto the transmissive display panel. Moreover, wide cross-hatched lines slanting from top left to bottom right are drawn on an area where the light-shielding portion 132 or 532 is overlapped with the transmissive display panel. This will be similar to FIG. 14 to be described later. Each pixel is surrounded by black matrix.

In this regard, in a case where a width of the light-transmissive portion 131 in the parallax barrier along a first direction is equal to a pitch ND of a sub-pixel array along the first direction (see FIG. 23A), even if a viewpoint of a viewer observing an image is slightly shifted to the first direction (see FIG. 23B), there is no change in size of the pixel area that is not covered with the light-shielding portion 132. Thus, even if the viewpoint of a viewer observing an image is slightly sifted to the first direction, there is no change in the brightness of the screen. Therefore, the moire is not generated.

On the other hand, in a case where a width of the light-transmissive portion 531 in the parallax barrier along the first direction is not equal to the pitch ND of a sub-pixel array along the first direction (see FIG. 24A), when the viewpoint of a viewer observing an image is slightly shifted to the first direction (see FIG. 24B), there is a change in size of the pixel area that is not covered with the light-shielding portion 532. Thus, when the viewpoint of a viewer observing an image is slightly sifted to the first direction, there is a change in the brightness of the screen. As a result, the moire is generated.

SUMMARY

In the image display device described in Japanese Patent Application Laid-Open Publication No. 2005-086056, the parallax barrier is arranged on the front face (viewer side) of the transmissive display panel. Further, display devices having such an arrangement are referred to as "front barrier mode" for convenience. In addition, the width of light-transmissive portions (apertures) in the parallax barrier is consistent with the horizontal pixel pitch. However, in a case where the width of light-transmissive portions (apertures) in the parallax barrier is consistent with the horizontal pixel pitch, as described later, it has been found that it is possible to prevent the shape-induced moire from being generated but it is difficult to prevent the diffraction-induced moire from being generated.

According to embodiments of the present disclosure, there is provided a display device having a configuration and structure capable of preventing the generation of the diffraction-induced moire as well as the shape-induced moire.

According to an embodiment of the present disclosure, there is provided a display device including a transmissive display panel composed of pixels arranged in a form of a two-dimensional matrix in a first direction and a second direction different from the first direction, a planar illumination device for illuminating the transmissive display panel from a rear surface thereof, and a parallax barrier disposed between the transmissive display panel and the planar illumination device, for dividing an image displayed on the transmissive display panel into images for multiple viewpoints. The parallax barrier and the transmissive display panel are arranged opposite to each other with a predetermined gap therebetween. The parallax barrier includes a plurality of light-transmissive portions and light-shielding portions, the light-transmissive portions and light-shielding portions extending along an axis parallel to the second direction or an axis forming an acute angle with the second direction and being alternately juxtaposed along the first direction. One of the following equations is satisfied $0.95 \times ND \leq W_1 \leq 1.05 \times ND$ and $1.9 \times ND \leq W_1 \leq 2.1 \times ND$ where $W_1$ is a width of the light-transmissive portions along the first direction, and where ND is a pixel array pitch along the first direction.

In the display device according to the embodiments of the present disclosure, the parallax barrier is arranged on the back face of the transmissive display panel. The display device having such an arrangement is referred to as "back barrier mode" for convenience. Further, in the display device according to the embodiments of the present disclosure, a width $W_1$ of the light-transmissive portion along the first direction is substantially once or twice as much as the pitch ND of pixel array along the first direction. Therefore, in the display device according to the embodiments of the present disclosure, it is possible to reduce the generation of the diffraction-induced moire as well as the shape-induced moire. Moreover, because the parallax barrier is not directly visible to a viewer observing the display device, the quality of image displayed on the transmissive display panel is not lowered, and there is no problem that uneven color is generated on a surface of the parallax barrier by the reflection of external light. In addition, the transmissive display panel is illuminated by a planar illumination device through the parallax barrier, thus the problem of reduced reliability of the transmissive display panel due to light emitted from the planar illumination device is less likely to occur.

BRIEF DESCRIPTION OF THE DRAWINGS

FIG. 1 is a schematic perspective view showing a virtually exploded state of a back barrier display device according to a first embodiment of the present disclosure;

FIG. 13 is a schematic perspective view showing a virtually exploded state of a display device according to a fourth embodiment of the present disclosure;

FIG. 20 is a schematic view for explanation of images observed at viewpoints D1, D2, D3, and D4 in the central observation area;

FIG. 21 is a schematic view for explanation of images observed at viewpoints D1, D2, D3, and D4 in the left observation area;

FIG. 22 is a schematic view for explanation of images observed at viewpoints D1, D2, D3, and D4 in a right observation area;

DETAILED DESCRIPTION OF THE EMBODIMENT(S)

Figure 2A:
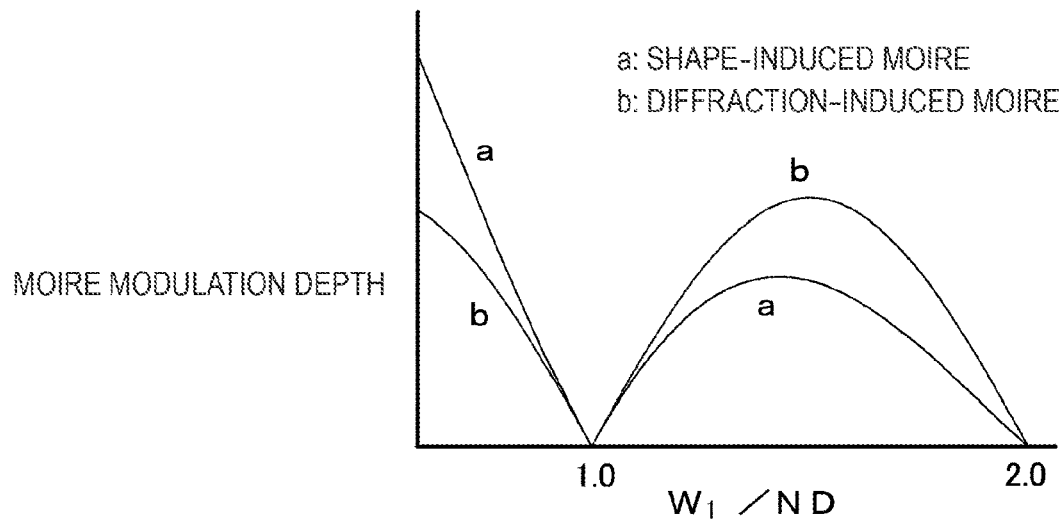
FIG. 2A is a graph showing results obtained by the simulation of a moire modulation depth in a back barrier display device according to the first embodiment.

It should be understood by those skilled in the art that various modifications, combinations, sub-combinations and alterations may occur depending on design requirements and other factors insofar as they are within the scope of the appended claims or the equivalents thereof.

1. Display Device of the Present Disclosure, General Explanation of the Present Disclosure 2. First Embodiment (Display Device of the Present Disclosure)

3. Second Embodiment (Modification of the First Embodiment)

4. Third Embodiment (Another Modification of the First Embodiment)

5. Fourth Embodiment (Yet Another Modification of the First Embodiment), the others

[Display Device of the Present Disclosure, General Explanation of the Present Disclosure]

In a display device according to an embodiment of the present disclosure, a parallax barrier can be made, for example, by providing light-transmissive portions (apertures) on a well-known material which is in the form of a plate, sheet or film. In addition, such a parallax barrier can be made by well-known methods such as a combination of photolithographic and etching techniques; various printing methods including a screen printing, ink-jet printing and metal mask printing methods; plating methods (electroplating or electroless plating methods); and lift-off methods. Alternatively, the parallax barrier is preferably composed of a liquid crystal display device because this allows a stereoscopic or three-dimensional image and two-dimensional image to be displayed. That is, in the display device according to an embodiment of the present disclosure, the parallax barrier is preferably composed of a liquid crystal display device at least including:

a first substrate, a first electrode formed and patterned on the first substrate, a second substrate disposed on an opposite side of the first substrate, a second electrode formed on the second substrate to be opposed to the first electrode, and a liquid crystal layer sandwiched between the first substrate and the second substrate.

In addition, the parallax barrier which is composed of the liquid crystal display device is not directly visible to a viewer observing the display device, and thus there is no necessary to consider chromatic dispersion or the like in a substrate constituting the liquid crystal display device.

When the parallax barrier is composed of the liquid crystal display device, a width $WD_{21}$ of a first electrode constituting a light-shielding portion along the first direction can be smaller than a width $W_2$ of the light-shielding portion along the first direction. Specifically, for example, this can be exemplified as follows:

$$1\ \mu m \le W_2 - WD_{21} \le 15\ \mu m$$

In addition, in this case, a width $WD_{11}$ of a first electrode constituting a light-transmissive portion along the first direction can be smaller than a width $W_1$ of the light-transmissive portion along the first direction. Specifically, for example, this can be exemplified as follows:

$$1\ \mu m \le W_1 - WD_{11} \le 15\ \mu m$$

In addition, when the parallax barrier including these preferred configurations is composed of a liquid crystal display device, the width $W_1$ of the light-transmissive portion along the first direction can be configured to be switched to any one of the following two conditions depending on the state of voltage applied to the first electrode and the second electrode:

$$0.95 \times ND \le W_1 \le 1.05 \times ND$$

$$1.9 \times ND \le W_1 \le 2.1 \times ND$$

This switching of the width $W_1$ of the light-transmissive portion makes it possible to increase the luminance of an image displayed on the transmissive display panel. Further, in this case, when no voltage is applied to the first electrode and the second electrode, a liquid crystal layer of the liquid crystal display device constituting the parallax barrier may be a state capable of transmitting light through the layer (normally white) or may be a state incapable of transmitting light through the layer (normally black).

Alternatively, in a case where the parallax barrier is composed of the liquid crystal display device, the area of liquid crystal display device constituting the light-shielding portion may be provided with the first electrode formed thereon, and the area of liquid crystal display device constituting the transmissive portion may be not provided with the first electrode. Further, in this case, when no voltage is applied to the first electrode and the second electrode, a liquid crystal layer of the liquid crystal display device constituting the parallax barrier is preferable to be in a state capable of transmitting light through the layer (normally white).

Alternatively, in a case where the parallax barrier is composed of the liquid crystal display device, the area of liquid crystal display device constituting the light-shielding portion may be provided with the first electrode formed thereon. Further, the light-transmissive portion is provided with an area where the first electrode is formed thereon and an area where the first electrode is not formed, these areas being juxtaposed along the first direction. A width $WD_{11}$ of a first electrode constituting a light-transmissive portion along the first direction can be smaller than a width $W_1$ of the light-transmissive portion along the first direction. Specifically, for example, this can be exemplified as follows:

$$1\ \mu m \le W_1 - WD_{11} \le 15\ \mu m$$

In this case, when no voltage is applied to the first electrode and the second electrode, a liquid crystal layer of the liquid crystal display device constituting the parallax barrier is preferable to be in a state capable of transmitting light through the layer (normally white). Furthermore, when the parallax barrier including this preferred configuration is composed of a liquid crystal display device, the width $W_1$ of the light-transmissive portion along the first direction can be configured to be switched to any one of the following two conditions depending on the state of voltage applied to the first electrode and the second electrode:

$$0.95 \times ND \leq W_1 \leq 1.05 \times ND$$

$$1.9 \times ND \leq W_1 \leq 2.1 \times ND$$

This switching of the width $W_1$ makes it possible to increase the luminance of an image displayed on the transmissive display panel.

In a case where the parallax barrier including such various preferred configurations described above is composed of the liquid crystal display device, a haze value of the transmissive display panel is preferably 15% or less. The haze value is used to measure the diffuse transmittance and total light transmittance using an integrating sphere light transmittance measuring device and to perform an evaluation using the ratio of the diffuse transmittance to the total light transmittance. The specific details of haze value may be referred to, for example, JIS K7136:2000. In order to obtain the haze value of the transmissive display panel as described above, for example, a transparent film having such a haze value may be bonded to a surface of the transmissive display panel which is opposite to a viewer. Alternatively, for example, the haze value can be controlled by roughing the surface of a polarizing plate or by dispersing a granular material having different refractive index into a polarizing plate material. If the haze value is high, the light from the transmissive display panel may be scattered when it directs to an observation area, and an image having low directivity may be often visually recognized.

Furthermore, in the display device according to embodiments of the present disclosure including the above-described various preferred shapes and configurations, the light-transmissive portion and light-shielding portion of the parallax barrier can be configured to be extended parallel to the direction of the second direction, alternatively the angle θ formed between an axis of the parallax barrier and the second direction may be an acute angle. Particularly, when a pitch of the pixel array along the second direction is $ND_2$, if the angle θ satisfies the following equation, $$\theta = \tan^{-1}(ND_2/ND)$$

then the positional relationship between each pixel and the light-transmissive portion of the parallel barrier which is opposite to each pixel is normally constant along the axis of the parallax barrier, thus it is possible to reduce crosstalk generated upon displaying a stereoscopic image and realize a high quality stereoscopic display. Alternatively, the light-transmissive portion constituting the parallax barrier can be configured to be arranged in a straight line along the axis of the parallax barrier. Alternatively, the light-transmissive portion constituting the parallax barrier can be configured to be arranged in a stepwise manner along the axis of the parallax barrier.

In the display device according to embodiments of the present disclosure including the above-described various preferred shapes and configurations (hereinafter collectively referred simply often to as "display device or the like of the present disclosure"), the transmissive display panel can be composed of, for example, a liquid crystal display panel. The configuration, structure, driving mechanism or the like of the liquid crystal display panel is particularly not limited. The transmissive display panel may be a monochrome or color display. Also, the transmissive display panel may be a simple matrix drive type or an active matrix drive type. In addition, in each of the embodiments described later, a liquid crystal display panel of the active matrix drive type is used as the transmissive display panel. The liquid crystal display panel is configured, for example, to include a front panel provided with a first transparent electrode, a rear panel provided with a second transparent electrode, and liquid crystal material disposed between the front panel and the rear panel. In addition, examples of the transmissive display panel in the display device or the like of the present disclosure also include a so-called semi-transmissive liquid crystal display panel in which each pixel is provided with a reflective area and a transmissive area.

More specifically, the front panel is composed of, for example, a first substrate made of a glass substrate, a first transparent electrode (also called a common electrode, and made of, for example, ITO (Indium Tin Oxide)) formed on an inner surface of the first substrate, and a polarizing film formed on an outer surface of the first substrate. Furthermore, in the color liquid crystal display panel, the front panel is provided with a color filter which is coated with an overcoat layer made of acrylic or epoxy resin in the inner surface of the first substrate, and the first transparent electrode is formed on the overcoat layer. An alignment layer is formed on the first transparent electrode. Examples of the arrangement pattern of the color filter may include delta, stripe, diagonal, and rectangle arrays.

On the other hand, more specifically, the rear panel is composed of, for example, a second substrate made of a glass substrate, a switching element formed on an inner surface of the second substrate, a second transparent electrode (also called a pixel electrode, and made of, for example, ITO) in which conduction/non-conduction is controlled by the switching element, and a polarizing film provided on an outer surface of the second substrate. An alignment layer is formed on the entire surface including the second transparent electrode. Various components and liquid crystal materials constituting these light-transmissive liquid crystal display panels can be composed of well-known components or materials. In addition, examples of the switching element can include three-terminal elements such as thin film transistor (TFT), and two-terminal elements such as a MIM (Metal Insulator Metal) element, a varistor element, or a diode.

Furthermore, in the color liquid crystal display panel, an area including a liquid crystal cell which is an overlapped area between the first transparent electrode and the second transparent electrode corresponds to one sub-pixel. A red light-emitting sub-pixel constituting each pixel is formed by a combination of the relevant area and a color filter through which a red color light is transmitted. A green light-emitting sub-pixel is formed by a combination of the relevant area and a color filter through which a green color light is transmitted. A blue light-emitting sub-pixel is formed by a combination of the relevant area and a color filter through which a blue color light is transmitted. The arrangement pattern of the red, green and blue light-emitting sub-pixels is consistent with the arrangement pattern of the color filter described above. One or multiple types of sub-pixels can be further added to these three types of sub-pixels to form a group (for example, a group in which a sub-pixel emitting a white light is added to increase the luminance, a group in which a sub-pixel emitting a complementary color light is added to obtain an expanded color gamut, a group in which a sub-pixel emitting a yellow color light is added to obtain an expanded color gamut, a group in which a sub-pixel emitting a yellow or cyan color light is added to obtain an expanded color gamut). Further, in these configurations, each sub-pixel corresponds to a "pixel" in the transmissive display panel of the display device or the like of the present disclosure.

When the number M×N of pixels arranged in a two-dimensional matrix is defined as (M, N), several resolutions for image display, such as VGA(640, 480), S-VGA(800, 600), XGA(1024, 768), APRC(1152, 900), S-XGA(1280, 1024), U-XGA(1600, 1200), HD-TV(1920, 1080), and Q-XGA (2048, 1536), (1920, 1035), (720, 480) and (1280, 960) can be exemplified as the value of (M, N). However, it is not limited to these values.

Furthermore, the configuration and structure of the liquid crystal display device constituting the parallax barrier can be same as or similar to those of the liquid crystal display panel constituting the transmissive display panel, except for the configuration or structure of pixel and sub-pixel. However, since the liquid crystal display device constituting the parallax barrier may have advantageously a function of a so-called optical shutter, it may not necessary to include a switching element or color filter which would be necessary for normal liquid crystal display devices displaying an image, and thus the simplified configuration and structure can be achieved, thereby ensuring high reliability and long life. In addition, it may not necessary to form black matrix, thereby simplifying the entire processes for manufacturing the liquid crystal device. The transmissive display panel and the first substrate of the liquid crystal display device may be opposed to each other. The transmissive display panel and the second substrate of the liquid crystal display device may be opposed to each other.

The planar illumination device (backlight) in the display device or the like of the present disclosure can be composed of the known planar illumination device. That is, the planar illumination device may be a direct type planar light source device or may be an edge light type (also called a side light type) planar light source device. The direct type planar light source device, for example, includes a light source disposed within a housing, a reflective unit which is disposed a portion of the housing below the light source and is configured to reflect upward light emitted from the light source, and a diffusion plate which is attached to an opening of the housing formed above the light source and is configured to diffuse and pass the light emitted from the light source and the light reflected from the reflective unit. On the other hand, the edge light type planar light source device, for example, includes a light guide plate and a light source disposed on the side of the light guide plate. In addition, a reflective unit is disposed below the light guide plate, and a diffusion or prism sheet is disposed above the light guide plate. The light source is composed of, for example, a cold cathode fluorescent lamp and emits white light. Alternatively, for example, the light source is composed of a light-emitting element such as a LED or semiconductor laser element.

A drive unit for driving the planar illumination device or the transmissive display panel can be composed of, for example, various circuits such as an image signal processing unit, a timing control unit, a data driver, a gate driver, and a light source control unit. They can be composed by using well-known circuit elements or the like.

The display device of the present disclosure can display a stereoscopic image. A stereoscopic image and two-dimensional image can be displayed depending on the configuration and structure of the display device of the present disclosure. Alternatively, the display device of the present disclosure can display images viewed differently by viewing the display device from different angles. In these cases, the image data to be transmitted to the display device may be an image data necessary to display a stereoscopic image or an image data necessary to display a two-dimensional image.

The switching of the width $W_1$ of the light-transmissive portion can be performed, for example, by providing with a changeover switch in the display device and by allowing a viewer to operate the changeover switch. Alternatively, the image signal processing unit in the display device can be configured to analyze image data to be displayed and automatically perform the switching of the width $W_1$ of the light-transmissive portion. In a case where image quality is important but image luminance is not so much important, the width $W_1$ of the light-transmissive portion will be small ($W_1=\alpha \cdot ND$). In a case where an image luminance is important but image quality is not so much important, the width $W_1$ of the light-transmissive portion will be large ($W_1=2\alpha \cdot ND$). In this regard, in a case where the width $W_1$ of the light-transmissive portion is to be large, when a stereoscopic image having strong stereoscopic vision is displayed on the transmissive display panel, the stereoscopic image may be observed as an overlapped image or image blurring may be occurred in the stereoscopic image, although it is slight. Thus, if it is determined by the image signal processing unit that a stereoscopic image having strong stereoscopic vision is displayed on the transmissive display panel, then the image signal processing unit may perform the switching to make the width $W_1$ of the light-transmissive portion smaller, on the contrary, if it is determined by the image signal processing unit that a stereoscopic image having weak stereoscopic vision is displayed on the transmissive display panel, then the image signal processing unit may perform the switching to make the width $W_1$ of the light-transmissive portion larger. These processes are performed on the basis of the analysis of a depth map in the image data to be displayed and the results obtained from the analysis. In this case, there may be a possibility that the luminance of the transmissive display panel is significantly changed due to frequent switching of the width $W_1$ of the light-transmissive portion, but possibly significant change in the luminance of the transmissive display panel can be controlled by appropriately adjusting the amount of light emitted in the planar illumination device (by controlling operations of the light source in the planar illumination device).

First Embodiment

Figure 16:
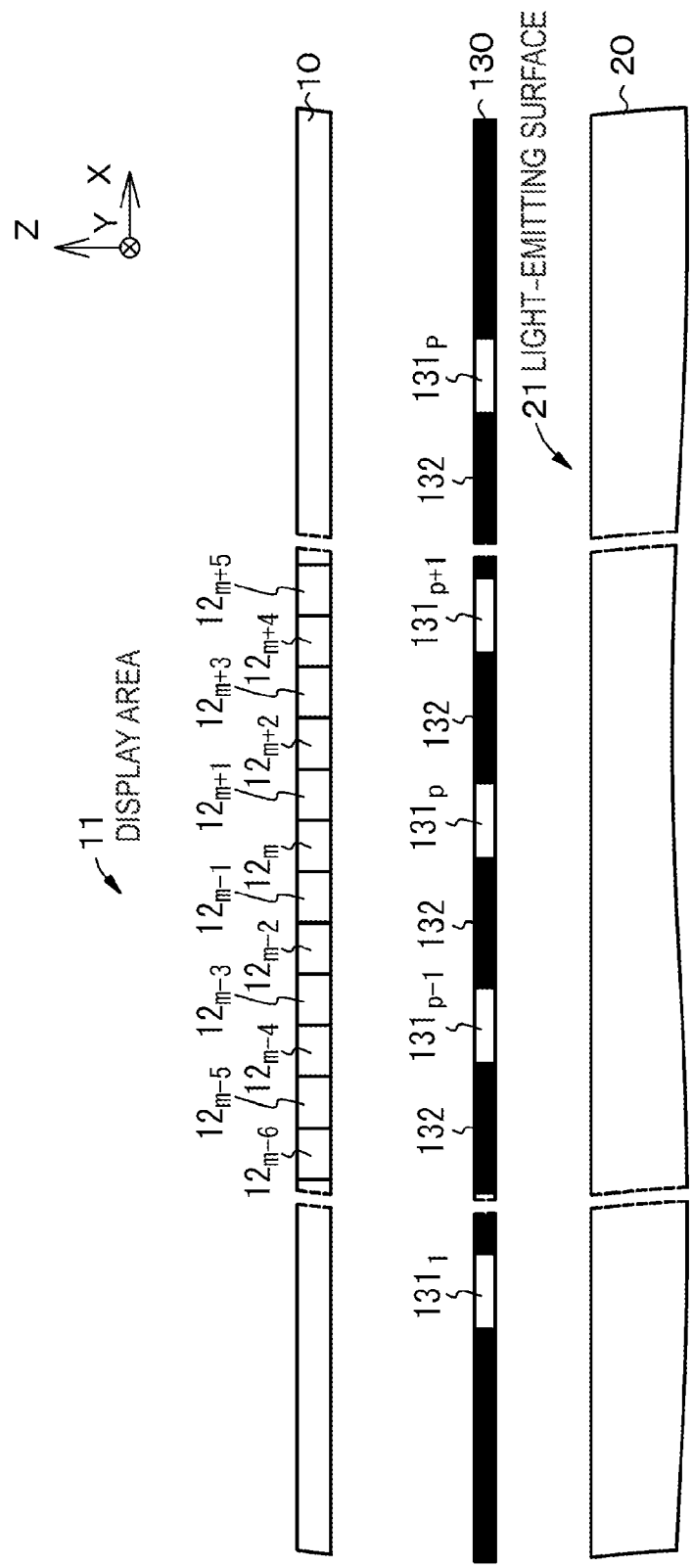
FIG. 16 is a partial schematic sectional view of the display device for explaining an arrangement relationship among a transmissive display panel, a parallax barrier, and a planar illumination device in the display device according to the first embodiment.

The first embodiment relates to the display device of the present disclosure employing a so-called back barrier mode. FIG. 1 is a perspective view schematically showing a virtually exploded state of the display device according to the first embodiment. FIG. 16 is a partial schematic view of the display device for explaining an arrangement relationship among a transmissive display panel 10, a parallax barrier 130, and a planar illumination device 20 in the display device according to the first embodiment.

As shown in FIG. 1, the display device of the first embodiment includes a transmissive display panel 10, a planar illumination device 20, and a parallax barrier 130. The transmissive display panel 10 is configured so that pixels 12 are arranged in a form of a two-dimensional matrix in a first direction (in this embodiment, specifically, horizontal or X direction) and a second direction (in this embodiment, specifically, vertical or Y direction) different from the first direction. The planar illumination device 20 illuminates the transmissive display panel 10 from a rear surface thereof. The parallax barrier 30 is disposed between the transmissive display panel 10 and the planar illumination device 20 and is configured to divide an image displayed on the transmissive display panel 10 into images for plural viewpoints.

The transmissive display panel 10 is composed of an active matrix color liquid crystal display panel. In a display area 11 of the transmissive display panel 10, M pixels and N pixels 12 are arranged in the first direction (horizontal direction, X direction) and the second direction (vertical direction, Y direction), respectively. The pixel 12 in the m-th row (where m=1, 2 . . . , M) is denoted by "pixel $12_m$". Each pixel 12 has red, green, and blue light-emitting sub-pixels. The transmissive display panel 10 includes a front panel at the observation area side, a rear panel at the parallax barrier side, a liquid crystal material disposed between the front panel and the rear panel, and so on. For convenience of illustration, in FIGS. 1, 13 and 15, the transmissive display panel 10 is shown as a single panel.

The liquid crystal display panel constituting the transmissive display panel 10 includes a front panel having a first transparent electrode, a rear panel having a second transparent electrode, and a liquid crystal material provided between the front panel and the rear panel. The front panel includes a first substrate made of a glass substrate, a first transparent electrode formed on an inner surface of the first substrate, and a polarizing film formed on an outer surface of the first substrate. Furthermore, a color filter which is coated with an overcoat layer made of acrylic or epoxy resin is provided in the inner surface of the first substrate, and the first transparent electrode is formed on the overcoat layer. An alignment layer is formed on the first transparent electrode. On the other hand, the rear panel is composed of a second substrate made of a glass substrate, a switching element formed on the inner surface of the second substrate, a second transparent electrode in which conduction/non-conduction is controlled by the switching element, and a polarizing film formed on the outer surface of the second substrate. An alignment layer is formed on the entire surface including the second transparent electrode. An area including a liquid crystal cell which is an overlapped area between the first transparent electrode and the second transparent electrode corresponds to one sub-pixel.

The parallax barrier 130 and the transmissive display panel 10 are arranged opposite to each other with a predetermined gap ($Z_1$) therebetween. Specifically, in the display device of the first embodiment, the transmissive display panel 10 and the parallax barrier 130 are formed to be spaced apart from each other by a gap. The gap may be filled with an air or vacuum layer, or may be occupied by a transparent member (not shown). In consideration of the refractive index of material filling the gap, the optical path length may be $Z_1$. In addition, the parallax barrier 130 includes a plurality of light-transmissive portions 131 and light-shielding portions 132 which are juxtaposed along the first direction (horizontal direction, X direction) in an alternate fashion. The light-transmissive portions 131 and light-shielding portions 132 are extended along an axis AX parallel to the second direction (vertical direction, Y direction) or forms an acute angle with the second direction (vertical direction, Y direction). In addition, in the first embodiment, the light-transmissive portions 131 and light-shielding portions 132 are extended parallel to the second direction (vertical direction, Y direction). That is, the axis AX of the parallax barrier 130 is parallel to the second direction (vertical direction, Y direction). A plurality (P) of light-transmissive portions (apertures) 131 are arranged in the first direction (horizontal direction, X direction). The light-transmissive portion 131 in the p-th row (where, p=1, 2, . . . , P) is denoted by a light-transmissive portion $131_p$. A relationship between the "P" and above-described "M" will be described later with reference to FIGS. 17, 18 and 19.

The planar illumination device 20 is composed of, for example, a direct type planar light-source device. The light which is generated from a light source made of LED and diffused through a diffusion plate or the like illuminates the rear surface of the transmissive display panel 10 from a light emitting surface 21. Some of the light emitted from the planar illumination device 20 is blocked by the parallax barrier 130, and thus an image displayed by the transmissive display panel 10 is divided into images for a plurality of viewpoints.

Furthermore, a distance between the parallax barrier 130 and the transmissive display panel 10, an array pitch of pixels 12 in the X direction (hereinafter, often referred simply to as "pixel pitch"), and a pitch of the light-transmissive portions 131 in the X direction (hereinafter, often referred simply to as "light-transmissive portion pitch") are set to satisfy the condition that a preferred stereoscopic image is observable in the observation area predefined by the specifications of the display device. The condition will be described below in detail.

In the first embodiment, the case where the number of viewpoints of an image displayed on the display device is assumed to be the respective four viewpoints D1, D2, D3, and D4 in the observation areas $WA_L$, $WA_C$, and $WA_R$ shown in FIG. 1 will be explained, however, this is not limited thereto. The number of observation areas and the number of viewpoints can be appropriately set depending on the design of the display device.

Figure 17:
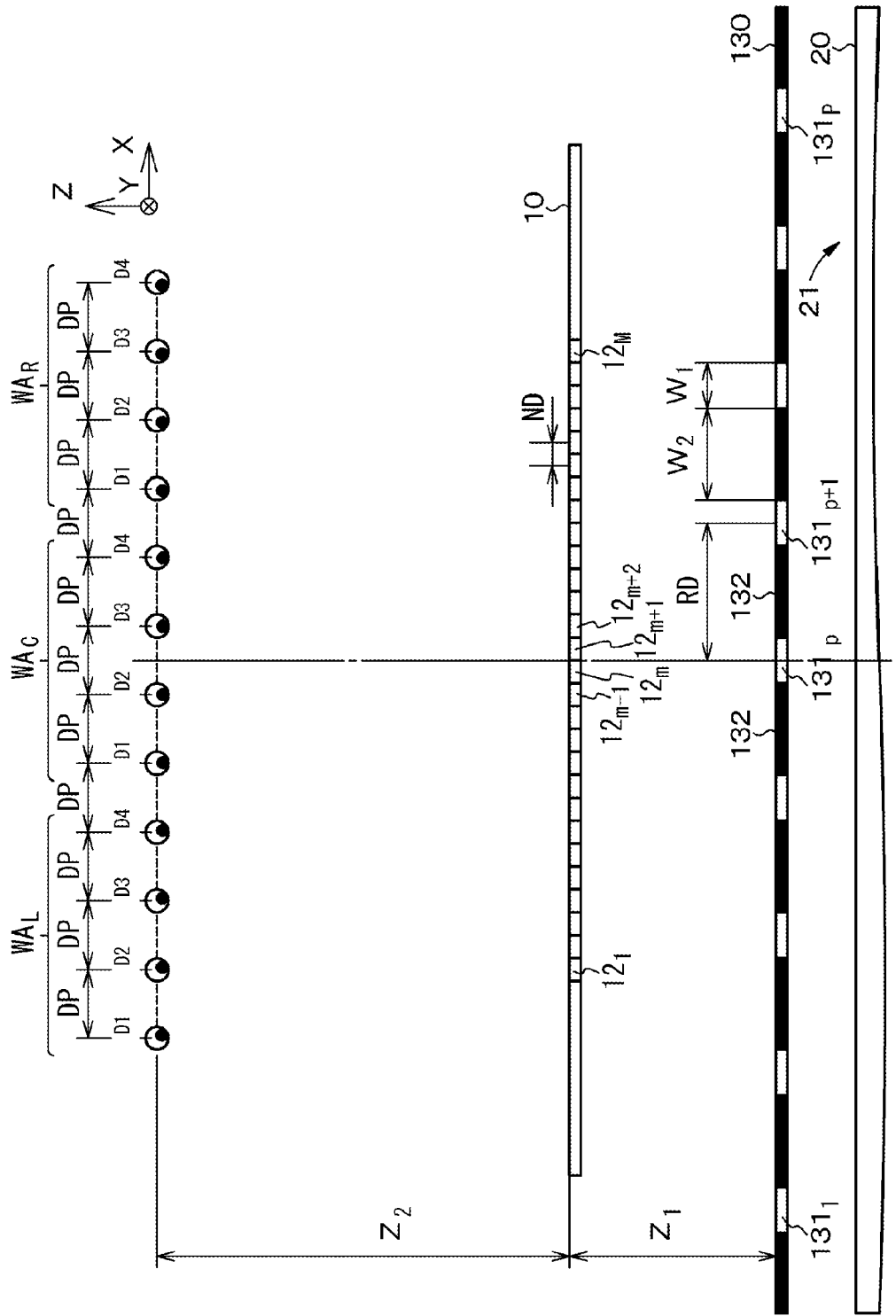
FIG. 17 is a schematic view for explanation of an arrangement relationship among viewpoints D1, D2, D3, and D4 in observation areas, the transmissive display panel, the parallax barrier, and the planar illumination device, shown in FIG. 1.
Figure 18:
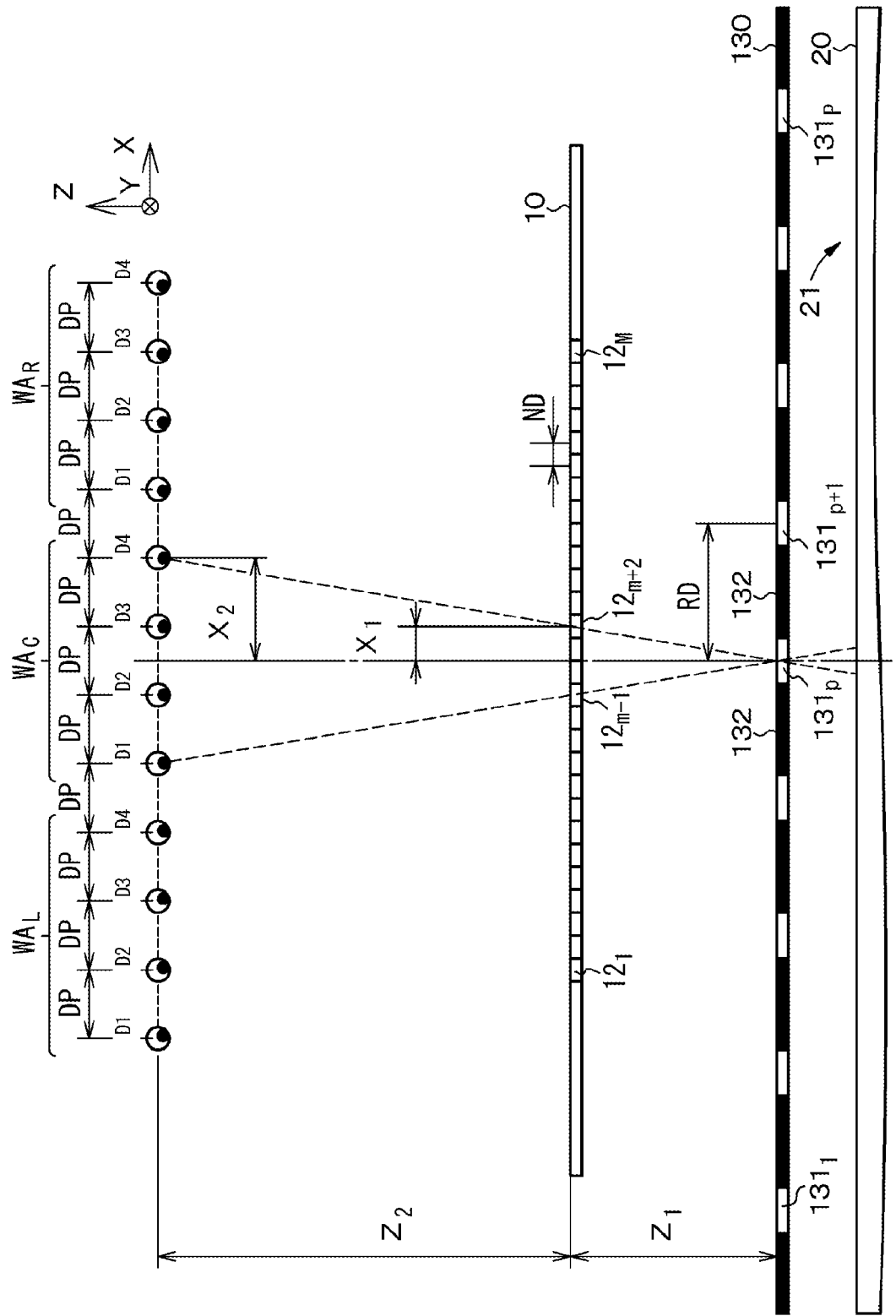
FIG. 18 is a schematic view for explanation of a condition that light from pixels may travel toward viewpoints D1, D2, D3, and D4 in a central observation area.
Figure 19:
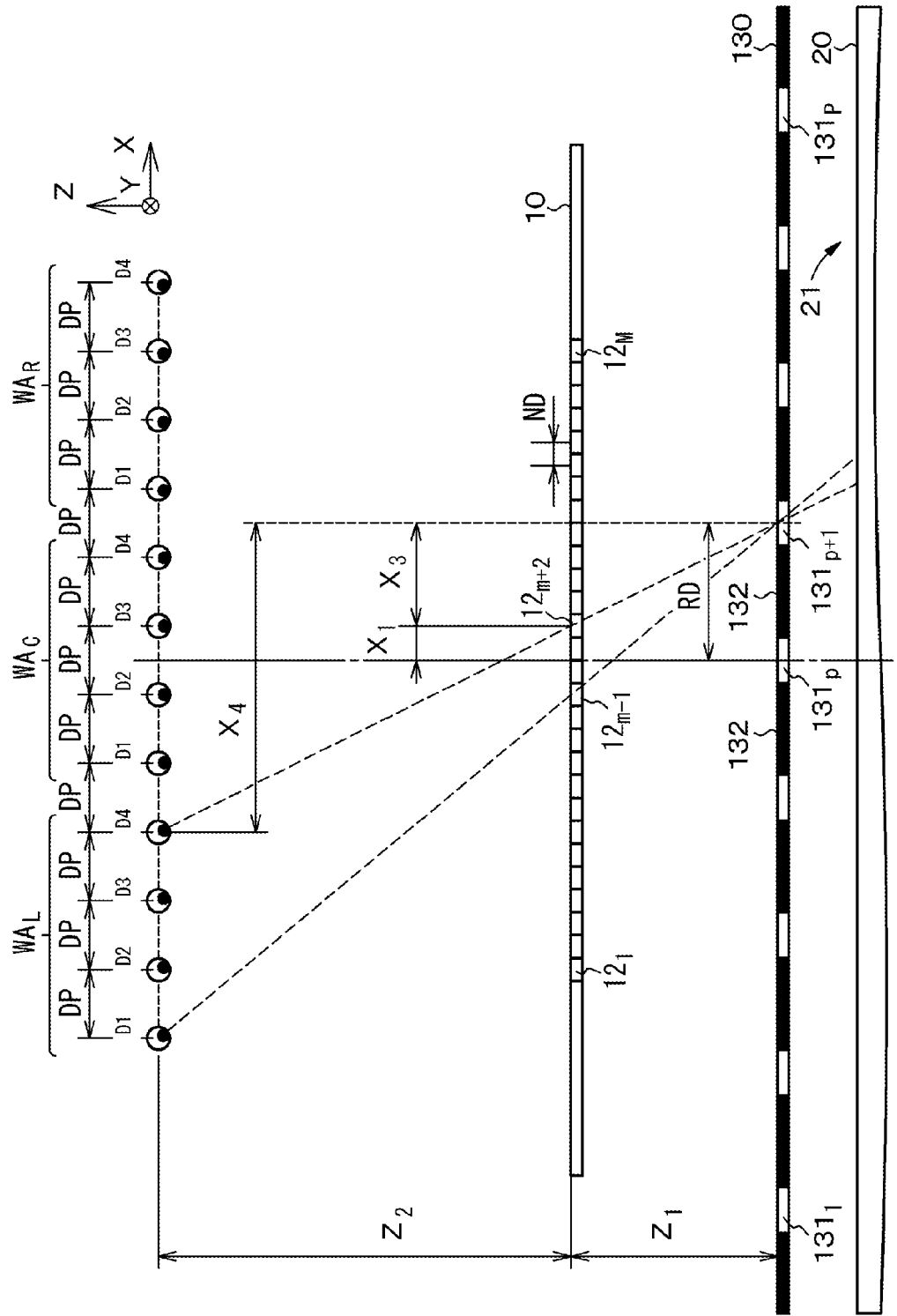
FIG. 19 is a schematic view for explanation of a condition that light from pixels may travel toward viewpoints D1, D2, D3, and D4 in a left observation area.

FIG. 17 illustrates a schematic view for explanation of an arrangement relationship among the respective viewpoints D1, D2, D3, and D4 in the observation areas $WA_L$, $WA_C$, and $WA_R$, the transmissive display panel 10, the parallax barrier 130, and the planar illumination device 20 shown in FIG. 1. Furthermore, FIG. 18 is a schematic view for explanation of a condition that light from pixels 12 directs to the viewpoints D1, D2, D3, and D4 in the central observation area $WA_C$. Moreover, FIG. 19 is a schematic view for explanation of a condition that light from pixels 12 directs to the viewpoints D1, D2, D3, and D4 in the left observation area $WA_L$.

For convenience of explanation, it is assumed that an odd number of the light-transmissive portions 131 are arranged in the X direction and the light-transmissive portion $131_p$ in the p-th row is positioned midway between a light-transmissive portion $131_1$ and a light-transmissive portion $131_P$. Also, a boundary between a pixel $12_m$ in the m-th row and a pixel $12_{m+1}$ in the (m+1)-th row and a midpoint between the viewpoint D2 and viewpoint D3 in the observation area $WA_C$ are assumed to be positioned on the virtual straight line extending to the Z direction through the center of the light transmissive portion $131_p$. The pixel pitch is denoted by "ND" (unit: mm), and the light-transmissive portion pitch is denoted by "RD" (unit: mm). In addition, a distance between the light-transmissive portion 131 and the transmissive display panel 10 is denoted by "$Z_1$" (unit: mm), and a distance between the transmissive display panel 10 and the observation areas $WA_L$, $WA_C$, $WA_R$ is denoted by "$Z_2$" (unit: mm). Also, a distance between neighboring viewpoints in the observation areas $WA_L$, $WA_C$, $WA_R$ is denoted by "DP" (unit: mm).

When the width of the light-transmissive portion 131 is denoted by $W_1$ and the width of the light-shielding portion 132 is denoted by $W_2$, the following relationship is established between the light-transmissive portion pitch RD and the width $W_1$ of the light-transmissive portion 131 and width $W_2$ of the light-shielding portion 132:

$$RD = W_1 + W_2$$

The condition that the lights passing through the pixels $12_{m-1}$, $12_m$, $12_{m+1}$, and $12_{m+2}$ from the light-transmissive portion $131_p$ direct to the viewpoints D1, D2, D3, and D4 in the central observation area $WA_C$ will be considered. For convenience of explanation, description is focused on the trajectory of light passing through the center of the light-transmissive portion 131 while assuming that the width $W_1$ of the light-transmissive portion 131 is sufficiently small. The distance from the virtual straight line extending to the Z direction through the center of the light-transmissive portion $131_p$ to the center of the pixel $12_{m+2}$ is denoted by $X_1$, and the distance from the virtual straight line extending to the Z direction through the center of the light-transmissive portion $131_p$ to the viewpoint D4 in the central observation area $WA_C$ is denoted by $X_2$. When the light travels from the light-transmissive portion $131_p$ to the viewpoint D4 of the observation area $WA_C$ through the pixel $12_{m+2}$, the condition given by the following Equation (1) is satisfied from the geometric similarity relationship:

$$Z_1/X_1=(Z_1+Z_2)/X_2 \qquad (1)$$

where $X_1=1.5 \times ND$ and $X_2=1.5 \times DP$, thus by substituting them into the Equation (1), the Equation (1) can be expressed as the following Equation (1'):

$$Z_1/(1.5 \times ND)=(Z_1+Z_2)/(1.5 \times DP) \qquad (1')$$

It is geometrically clear that, when the above Equation (1') is satisfied, the respective lights transmitted through the pixels $12_{m-1}$, $12_m$, and $12_{m+1}$ from the light-transmissive portion $131_p$ travel toward the viewpoints D1, D2, and D3 in the observation area $WA_C$.

Next, the condition that the respective lights transmitted through the pixels $12_{m-1}$, $12_m$, $12_{m+1}$, and $12_{m+2}$ from the light-transmissive portion $131_{p+1}$ travel toward the viewpoints D1, D2, D3, and D4 in the left observation area $WA_L$ will be considered.

A distance from the virtual straight line extending to the Z direction through the center of the light-transmissive portion $131_{p+1}$ to the center of the pixel $12_{m+2}$ is denoted by $X_3$, and a distance from the virtual straight line extending to the Z direction through the center of the light-transmissive portion $131_{p+1}$ to the viewpoint D4 in the left observation area $WA_L$ is denoted by $X_4$. When the light travels from the light-transmissive portion $131_{p+1}$ to the viewpoint D4 in the observation area $WA_L$ through the pixel $12_{m+2}$, the condition given by the following Equation (2) is satisfied from the geometric similarity relationship:

$$Z_1/X_3=(Z_1+Z_2)/X_4 \qquad (2)$$

where $X_3=RD-X_1=RD-1.5 \times ND$ and $X_4=RD+2.5 \times DP$, thus by substituting them into the Equation (2), the Equation (2) can be expressed as the following Equation (2'):

$$Z_1/(RD-1.5 \times ND)=(Z_1+Z_2)/(RD+2.5 \times DP) \qquad (2')$$

It is geometrically clear that, when the above Equation (2') is satisfied, the respective lights transmitted through the pixels $12_{m-1}$, $12_m$, and $12_{m+1}$ from the light-transmissive portion $131_p$ travel toward the viewpoints D1, D2, and D3 in the observation area $WA_C$.

Note that a condition for the respective lights transmitted through the pixels $12_{m-1}$, $12_m$, $12_{m+1}$, and $12_{m+2}$ from the light-transmissive portion $131_{p-1}$ to travel toward the viewpoints D1, D2, D3, and D4 in the right observation area $WA_R$ is the same as that when FIG. 19 is inverted with respect to the Z axis, and thus the explanation will be omitted.

Values of the distance $Z_2$ and the distance DP are set to predetermined values based on the specifications of the display device. Further, the value of the pixel pitch ND is determined depending to the structure of the transmissive display panel 10. For the distance $Z_1$ and the light-transmissive portion pitch RD, the following Equations (3) and (4) can be obtained from the Equation (1') and (2'):

$$Z_1=Z_2 \times ND/(DP-ND) \qquad (3)$$

$$RD=4 \times DP \times ND/(DP-ND) \qquad (4)$$

In the example described above, the value of the light-transmissive portion pitch RD is about four times the value of the pixel pitch ND. Therefore, the above-mentioned "M" and "P" have a relation of M≈P×4. The distance $Z_1$ and the light-transmissive portion pitch RD are set to satisfy the above-described conditions, and the images for the predetermined viewpoints may be observed at the respective viewpoints D1, D2, D3, and D4 in the observation areas $WA_L$, $WA_C$, and $WA_R$. For example, if the pixel pitch ND of the transmissive display panel 10 is 0.100 mm, the distance $Z_2$ is 1500 mm, and the distance DP is 65.0 mm, then the distance $Z_1$ is 2.31 mm and the light-transmissive portion pitch RD is 0.400 mm FIG. 20 is a schematic view for explanation of images observed at the viewpoints D1, D2, D3, and D4 in the central observation area $WA_C$. Also, FIG. 21 is a schematic view for explanation of images observed at the viewpoints D1, D2, D3, and D4 in the left observation area $WA_L$. Further, FIG. 22 is a schematic view for explanation of images observed at the viewpoints D1, D2, D3, and D4 in the right observation area $WA_R$.

As shown in FIGS. 20, 21, and 22, an image formed by the pixels 12 of pixels $12_1$, $12_5$, $12_9$ ... is observed at the viewpoint D1 and an image formed by the pixels 12 of pixels $12_2$, $12_6$, $12_{10}$ ... is observed at the viewpoint D2. Further, an image formed by the pixels 12 of pixels $12_3$, $12_7$, $12_{11}$ ... is observed at the viewpoint D3 and an image formed by the pixels 12 of pixels $12_4$, $12_8$, $12_{12}$ ... is observed at the viewpoint D4. Therefore, the image for the first viewpoint is displayed using the pixels 12 of pixels $12_1$, $12_5$, $12_9$ ..., the image for the second viewpoint is displayed using the pixels 12 of pixels $12_2$, $12_6$, $12_{10}$ ..., the image for the third viewpoint is displayed using the pixels 12 of pixels $12_3$, $12_7$, $12_{11}$ ..., and the image for the fourth viewpoint is displayed using the pixels 12 of pixels $12_4$, $12_8$, $12_{12}$ ..., accordingly a viewer can recognize the image as a stereoscopic image.

Although the number of viewpoints is "4" in the above explanation, the number of viewpoints may be selected as appropriate depending to the specifications of the display device. For example, a configuration with the number of viewpoints "2" or a configuration with the number of viewpoints "6" may be employed. In these cases, the configurations of the parallax barrier 30 or the like may be altered as appropriate. This is similar to other embodiments, which will be described later.

In the display device of the first embodiment, in order to reduce the diffraction-induced moire as well as the shape-induced moire, the following condition is satisfied:

$$0.95 \times ND \leq W_1 \leq 1.05 \times ND$$

for example, $$W_1=1.0 \times ND$$

Alternatively, the following condition is satisfied:

$$1.9 \times ND \leq W_1 \leq 2.1 \times ND$$

for example, $$W_1=2.0 \times ND$$

In addition, in a case where image quality in the display device is important and its image luminance is not so much important, a form satisfying the following condition may be employed:

$$0.95 \times ND \leq W_1 \leq 1.05 \times ND$$

On the contrary, in a case where image luminance in the display device is important and its image quality is not so much important, a form satisfying the following condition may be employed:

$$1.9 \times ND \leq W_1 \leq 2.1 \times ND$$

In addition, in a case where the following condition is satisfied, $$1.9 \times ND \leq W_1 \leq 2.1 \times ND$$

when a stereoscopic image having strong stereoscopic vision is displayed on the display device, the stereoscopic image may be observed as an overlapped image or image blurring may be occurred in the stereoscopic image, although it is slight.

Figure 2B:
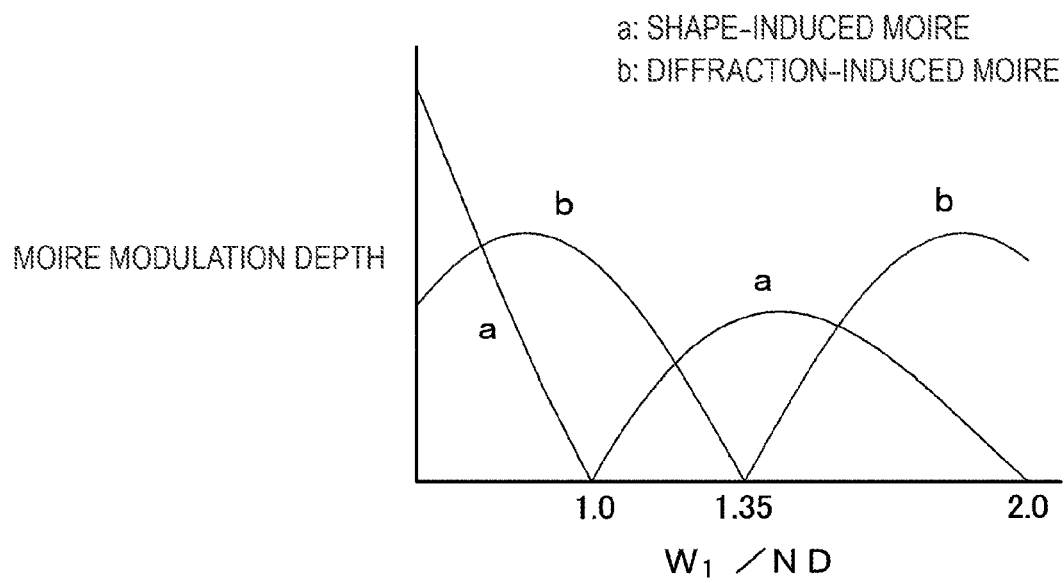
FIG. 2B is a graph showing results obtained by the simulation of a moire modulation depth in the front barrier display device in the related art.

FIG. 2A shows results obtained by the simulation of a moire modulation depth in the back barrier display device according to the first embodiment, and FIG. 2B shows results obtained by the simulation of a moire modulation depth in the front barrier display device in the related art. In addition, in FIGS. 2A and 2B, the horizontal axis indicates the values of the width $W_1$ of the light-transmissive portion along the first direction when the pitch ND of the pixel array along the first direction is "1". In FIGS. 2A and 2B, "a" indicates the moire modulation depth due to the shape-induced moire, and "b" indicates the moire modulation depth due to the diffraction-induced moire. In addition, the vertical axis is the moire modulation depth. The moire modulation depth can be represented as a change in luminance due to moire on the display surface of the display device (i.e., (maximum luminance value−minimum luminance value)/(maximum luminance value+minimum luminance value)).

In the simulation of the moire modulation depth, diffraction calculation including the shape of pixel in the transmissive display panel and the shape of the light-transmissive portion in the parallax barrier is performed, based on the illumination calculation of the partial coherent theory in consideration of spatial coherence.

When the direction perpendicular to the display area 11 of the transmissive display panel 10 is an optical propagation axis z, it is estimated how the diffraction is changed along the optical propagation axis z in the in-plane distribution of the light. In a computational model, the change is limited to only one axis by the separation of variables. As shown in the conceptual view of FIG. 3B, a rectangular aperture $P_0(\xi)$ and a rectangular aperture $P_x(x)$ are placed on the $\xi$ axis and the x axis, respectively, which are separated by a gap $Z_0$ (=$Z_1$). In a case where the back barrier mode is employed, the $P_0(\xi)$ corresponds to the light-transmissive portion of the parallax barrier, and the $P_x(x)$ corresponds to the pixel in the transmissive display panel. On the other hand, in a case where the front bather method is employed, the $P_0(\xi)$ corresponds to the pixel in the transmissive display panel, and the $P_x(x)$ corresponds to light-transmissive portion of the parallax barrier. In addition, a u axis is placed on a position at a distance of $z_i$ from the x axis as an image observation position (projection screen plane). The goal of the calculation is to obtain an optical profile on the u axis. Since the goal is to obtain the optical profile at the image observation position, a plane perpendicular to the z axis of the image observation position is called the projection screen plane for convenience.

It is assumed that there is an equivalent light source in which the light source having a spectral distribution of a center wavelength $\lambda$ (in the following Equation (A), $\lambda$ is denoted by "$\overline{\lambda}$" which has an upper-bar "-" above the symbol "$\lambda$") is distributed in the aperture $P_0(\xi)$ on the $\xi$ axis, and the spatial coherence of the light source is $\mu(\Delta\xi)$. By the calculation based on the partial coherent theory, an intensity I(u) on a screen can be expressed as the following Equation (A) by using a joint intensity $J_i(u, 0)$ on the screen. Note that the u in the following Equation (A) is denoted by "$\overline{u}$" which has an upper-bar "-" above the symbol "u".

$$I(\overline{u}) = \tag{A}$$

$$J_i(\overline{u}, 0) = \frac{I_o}{(\overline{\lambda} z_o)^2 (\overline{\lambda} z_i)^2} \times \int_{-\infty}^{\infty} \left\{ \int_{-\infty}^{\infty} P_x(\overline{x} - \Delta x/2) P_x^*(\overline{x} + \Delta x/2) \times \right.$$

$$\left\{ \int_{-\infty}^{\infty} \mu(\Delta\xi) \left( \int_{-\infty}^{\infty} P_o(\overline{\xi} - \Delta\xi/2) P_o^+(\overline{\xi} + \Delta\xi/2) \right. \right.$$

$$\left. \exp\left[ j \frac{2\pi}{\overline{\lambda} z_o} (\overline{\xi} \Delta x - \overline{\xi} \Delta\xi) \right] d\overline{\xi} \right\} \times$$

$$\left. \exp\left[ j \frac{2\pi}{\overline{\lambda} z_o} \overline{x} \Delta\xi \right] d\Delta\xi \right\} \times \exp$$

$$\left[ -j \frac{2\pi}{\overline{\lambda}} \left( \frac{1}{z_o} + \frac{1}{z_i} \right) \overline{x} \Delta x \right] d\overline{x} \right\} \times \exp\left[ j \frac{2\pi}{\overline{\lambda}} \frac{\overline{u} \Delta x}{z_i} \right] d\Delta x$$

In the Equation (A), $I_0$ indicates a constant representing an optical intensity. A variable "$\overline{\xi}$" with an upper-bar "-" above the "$\xi$", a variable "$\overline{x}$", with an upper-bar "-" above the "x", and a variable "$\overline{u}$" indicate each individual center of gravity of the respective two-variables $\xi_1$ and $\xi_2$, $x_1$ and $x_2$, $u_1$ and $u_2$, when the joint intensity is defined on the basis of the partial coherent theory in the respective $\xi$ axis, x axis and u axis planes. The $\Delta\xi$ and $\Delta x$ indicate an individual difference value of these two-variables. The distribution of the light from areas of a particular pixel and parallax barrier can be calculated, and the optical intensity of the pixel observed by a viewer located in particular position can be accurately estimated, on the basis of the Equation (A).

The radiance distribution in a case where the entire pixel is all turned on (entire white display) can be obtained using the Equation (A) to calculate the optical profile in the project screen plane by the light from each pixel. $P_{(O,n)}(\xi)$ is defined for every pixel, the optical profile $I_n(u)$ (the u in the following Equation (B) is denoted by "$\overline{u}$" which has an upper-bar "-" above the symbol "u") produced from them is calculated. Since total white lighting is a total sum of illumination by all pixels, the following Equation (B) can be established:

$$I_{total}(\overline{u}) = \sum_n I_n(\overline{u}) \tag{B}$$

Figure 3A:
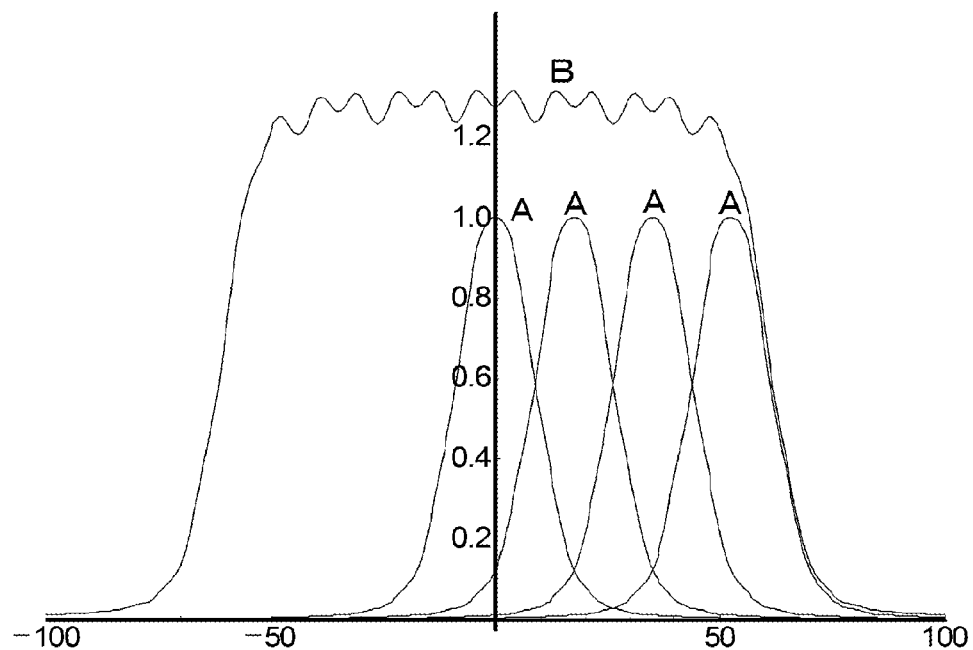
FIG. 3A is a graph showing an exemplary luminance profile obtained by the calculation based on a illumination calculation of partial coherence theory.
Figure 3B:
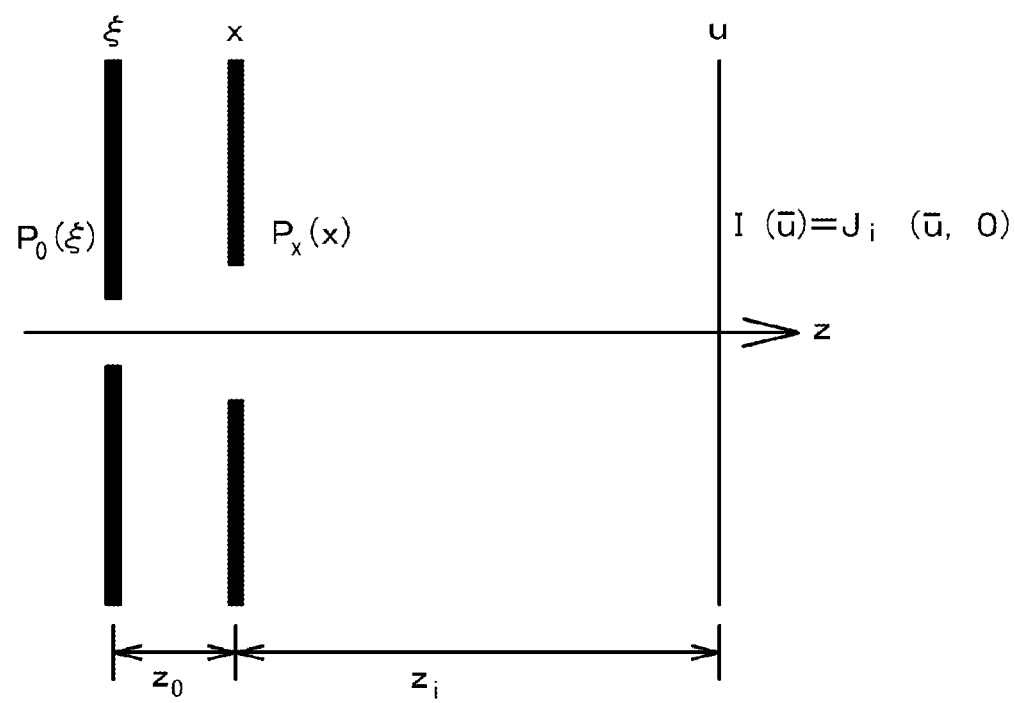
FIG. 3B is a conceptual view showing an image and light-transmissive portion for explaining diffraction calculation including a shape of image in a transmissive display panel and a shape of light-transmissive portion in a parallax barrier.

FIG. 3A shows an example of an actual calculation based on the Equation (B). The luminance profile $I_n(n)$ based on each of seven pixels (FIG. 3A shows the luminance profile "A" based on each of four pixels) is calculated, and then total luminance $I_{total}(u)$ denoted by "B" in FIG. 3A is obtained. When attention is focused on the luminance profile (optical profile) of the total luminance, the luminance unevenness may be occurred in a period higher than overlapped periods of each pixel in the total luminance, and there is a slight angular dependence in radiation angle distribution characteristics from a certain point (a specific slit) of the display area 11 in the transmissive display panel 10. Note that, in FIG. 3A, the horizontal axis is a distance (unit: mm) on the u axis, and the vertical axis is a relative luminance value when $I_0$ is set to "1.0". This luminance unevenness (see a jagged part of the top portion of shape (for example, "B" in FIG. 3A) similar to trapezoid, in the graphs of FIGS. 3A, 4, and 5) corresponds to the moire modulation depth.

Figure 4:
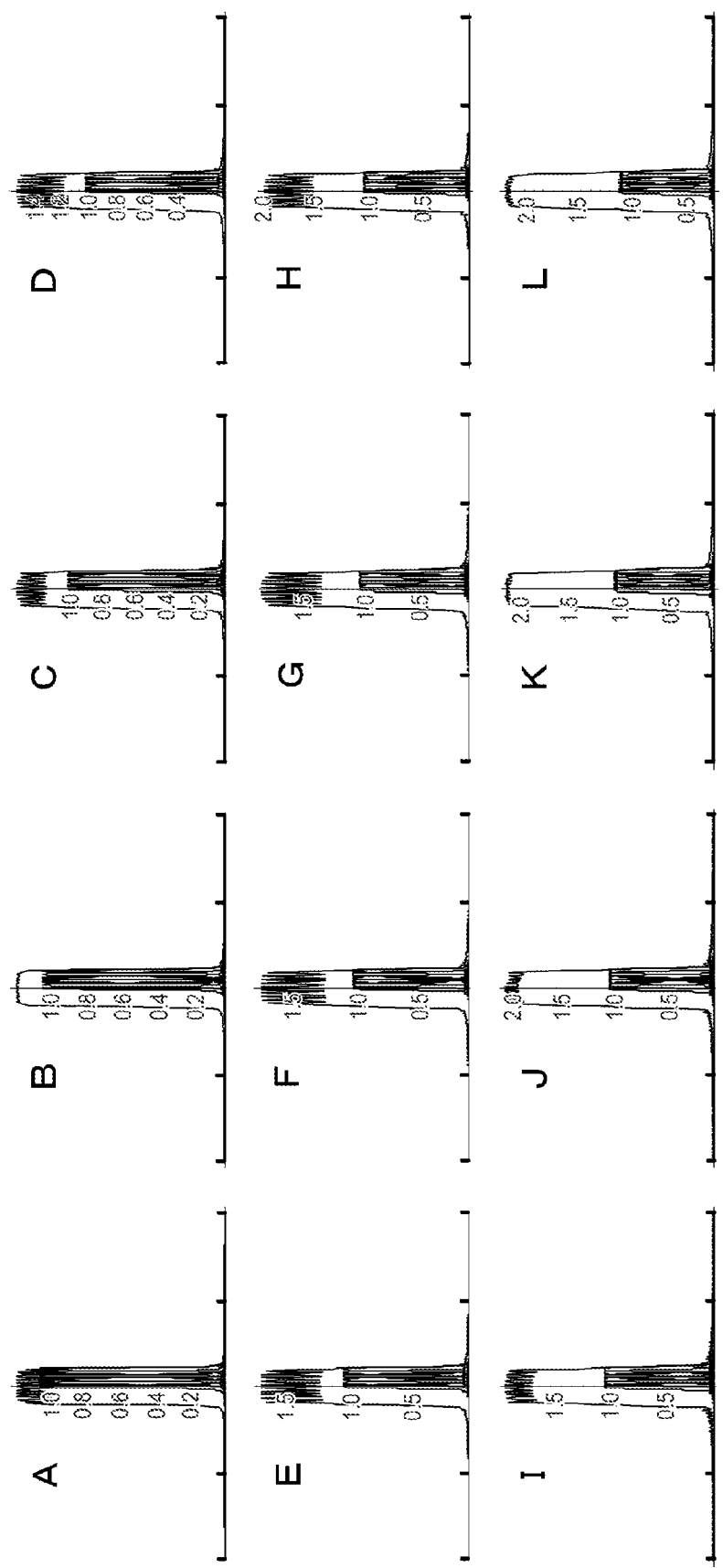
FIG. 4 is a graph showing a luminance profile obtained by the calculation based on illumination calculation of partial coherence theory using $W_1/ND$ as a parameter in a back barrier display device according to the first embodiment.
Figure 5:
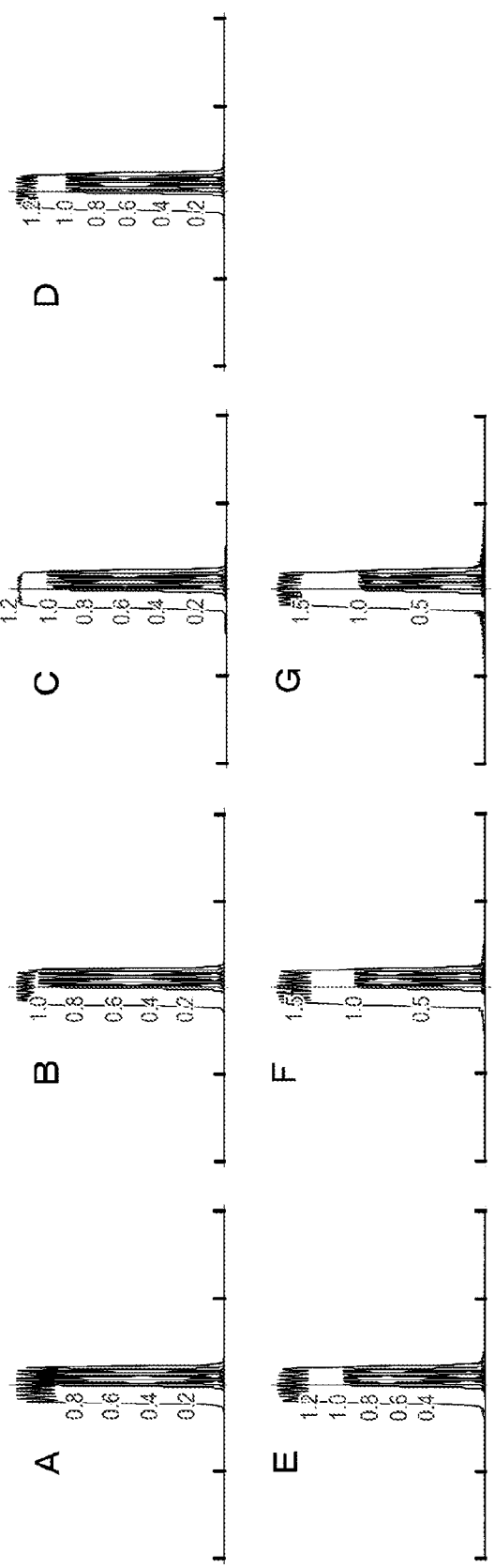
FIG. 5 is a graph showing a luminance profile obtained by the calculation based on illumination calculation of partial coherence theory using $W_1/ND$ as a parameter in the front barrier display device in the related art.

The calculation examples of the moire modulation in consideration of diffraction are showed in FIGS. 4 and 5. Note that FIG. 4 shows results obtained by the calculation of moire modulation in the back barrier display device according to the first embodiment, and FIG. 5 shows results obtained by the calculation of moire modulation in the front barrier display device in the related art. In FIG. 4, "A" indicates a case of $W_1/ND=0.9$, "B" indicates a case of $W_1/ND=1.0$, "C" indicates a case of $W_1/ND=1.1$, "D" indicates a case of $W_1/ND=1.2$, "E" indicates a case of $W_1/ND=1.3$, "F" indicates a case of $W_1/ND=1.4$, "G" indicates a case of $W_1/ND=1.5$, "H" indicates a case of $W_1/ND=1.6$, "I" indicates a case of $W_1/ND=1.7$, "J" indicates a case of $W_1/ND=1.8$, "K" indicates a case of $W_1/ND=2.0$, and "L" indicates a case of $W_1/ND=2.1$. further, in FIG. 5, "A" indicates a case of $W_1/ND=1.1$, "B" indicates a case of $W_1/ND=1.2$, "C" indicates a case of $W_1/ND=1.3$, "D" indicates a case of $W_1/ND=1.4$, "E" indicates a case of $W_1/ND=1.5$, "F" indicates a case of $W_1/ND=1.6$, and "G" indicates a case of $W_1/ND=1.7$. In FIGS. 4 and 5, the horizontal axis is a distance on the u axis, and the graduations are spaced apart at one meter intervals. Also, the vertical axis is a relative luminance when $I_0$ is set to "1.0". Further, parameters described below are used in the calculation.

[Back Bather Display Device of First Embodiment Shown in FIG. 4] Width of the rectangular aperture $P_0(\xi)$: 176 μm
Pitch of the rectangular aperture $P_0(\xi)$: 176 μm
Spatial coherence length $\Delta\mu$: 0.03 μm
Width of $P_x(x)$: 130 μm
Center wavelength $\lambda_0$: 500 nm
Gap $z_0$: 17.8 mm
$z_i$: 4 m

[Front Barrier Display Device in the Related Art Shown in FIG. 5] Width of the rectangular aperture $P_0(\xi)$: 130 μm
Pitch of the rectangular aperture $P_0(\xi)$: 176 μm
Spatial coherence length $\Delta\mu$: 0.03 μm
Width of $P_x(x)$: 176 μm
Center wavelength $\lambda_0$: 500 nm
Gap $z_0$: 17.8 mm
$z_i$: 4 m Note that $\Delta\mu$ is called a spatial coherence length, which indicates the distance where coherence between two points is maintained in a lateral direction. As an example, coherence function $\mu(\Delta\xi)$ representing coherence between two points can be expressed as $\mu(\Delta\xi)=\exp[-\Delta\xi^2/(2\cdot\Delta\mu^2)](2\pi)^{1/2}$ using the distance $\Delta\xi$ between two points on the light source. The function have a certain constant value $(1/(2\pi)^{1/2})$ while $\Delta\xi$ is small (i.e. the distance between two points is significantly short), and the value is rapidly decreased immediately after $\Delta\xi$ is larger than $\Delta\mu$. Thus, the function is generally used as a function representing the spatial coherence.

Referring to FIG. 2A, in the back barrier display device of the first embodiment, the moire modulation depth based on the shape-induced moire and diffraction-induced moire, while the value of $W_1/ND$ is increased, become minimal when the value is "1" and becomes increased when the value exceeds "1", subsequently while the value of $W_1/ND$ is decreased, becomes minimal when the value is "2". On the other hand, in the front bather display device in the related art, the moire modulation depth based on the shape-induced moire, while the value of $W_1/ND$ is increased, becomes minimal when the value is "1" and becomes increased when the value exceeds "1", subsequently while the value is decreased, becomes minimal when the value is "2". However, the moire modulation depth based on the diffraction-induced moire, while the value of $W_1/ND$ is increased, becomes minimal when the value is between "1" and "2", becomes increased when the value exceeds the range, and subsequently the moire modulation depth is a large value even when the value is "2". That is, in the display device of the first embodiment, when the value of $W_1/ND$ is "1" or "2", it is possible to reduce the generation of the shape-induced moire and diffraction-induced moire. But, in the display device in the related art, when the value of $W_1/ND$ is "1" or "2", it has been found that it is not possible to reduce the generation of the diffraction-induced moire, though the generation of the shape-induced moire may be reduced.

Figure 6A:
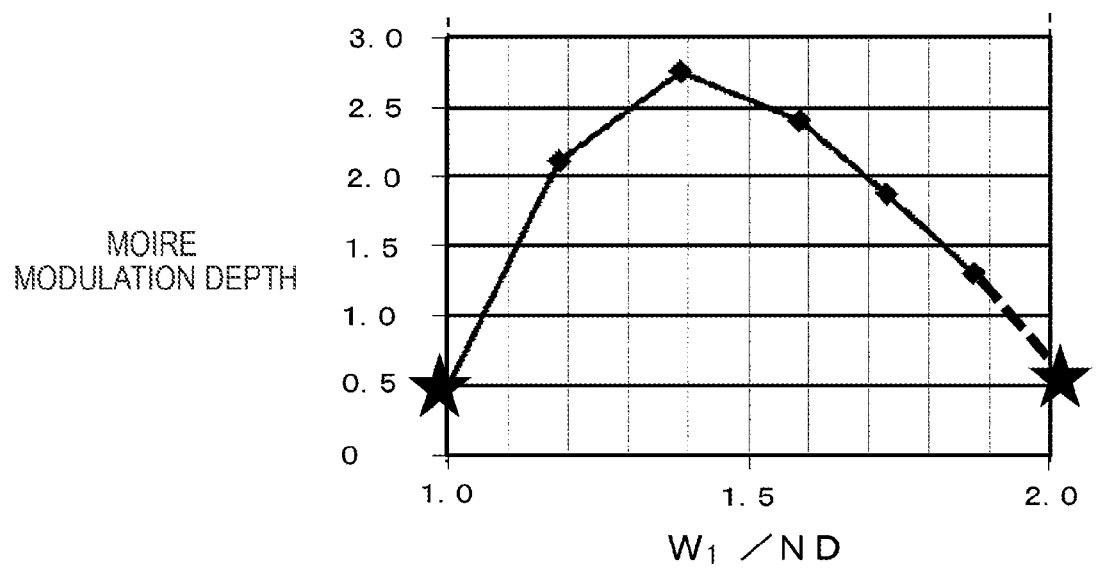
FIG. 6A is a graph showing results obtained by the actual measurement of a moire modulation depth in a back barrier display device according to the first embodiment.
Figure 6B:
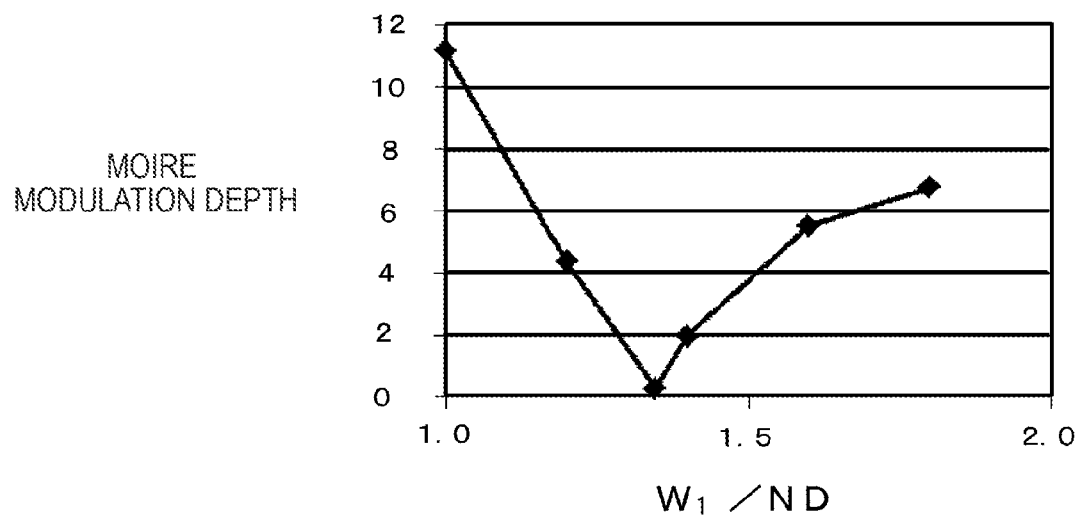
FIG. 6B is a graph showing results obtained by the actual measurement of a moire modulation depth in the front barrier display device in the related art.
Figure 7:
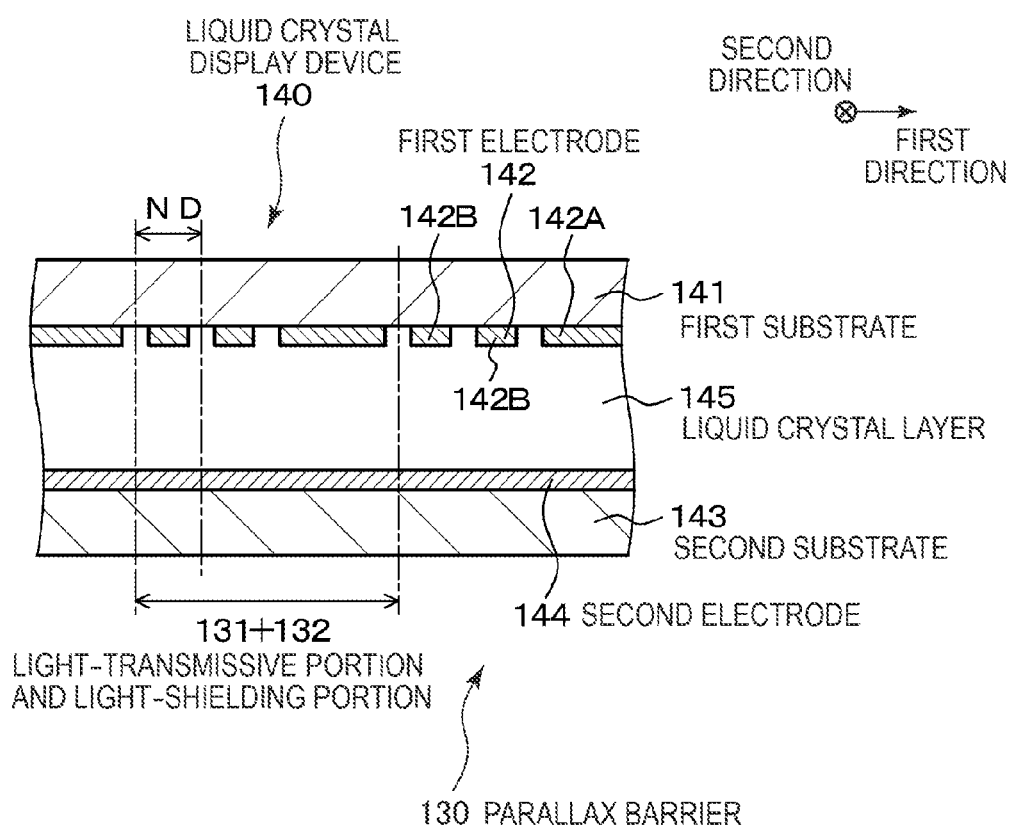
FIG. 7 is a partial schematic sectional view showing a liquid crystal display device which constitutes the parallax barrier in the display device according to the first embodiment.
Figure 8A:
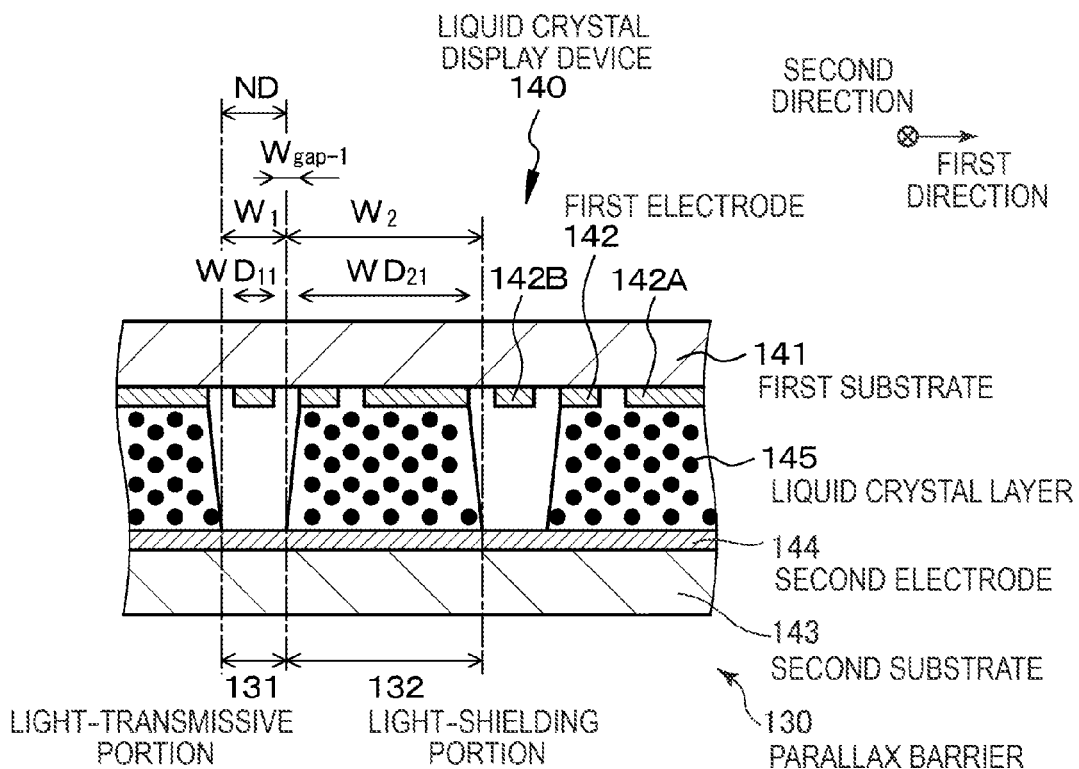
FIG. 8A is a partial schematic sectional view of a liquid crystal display device, which shows an operation state where $W_1/ND=1.0$ in the liquid crystal display device constituting the parallax barrier in the display device according to the first embodiment.
Figure 8B:
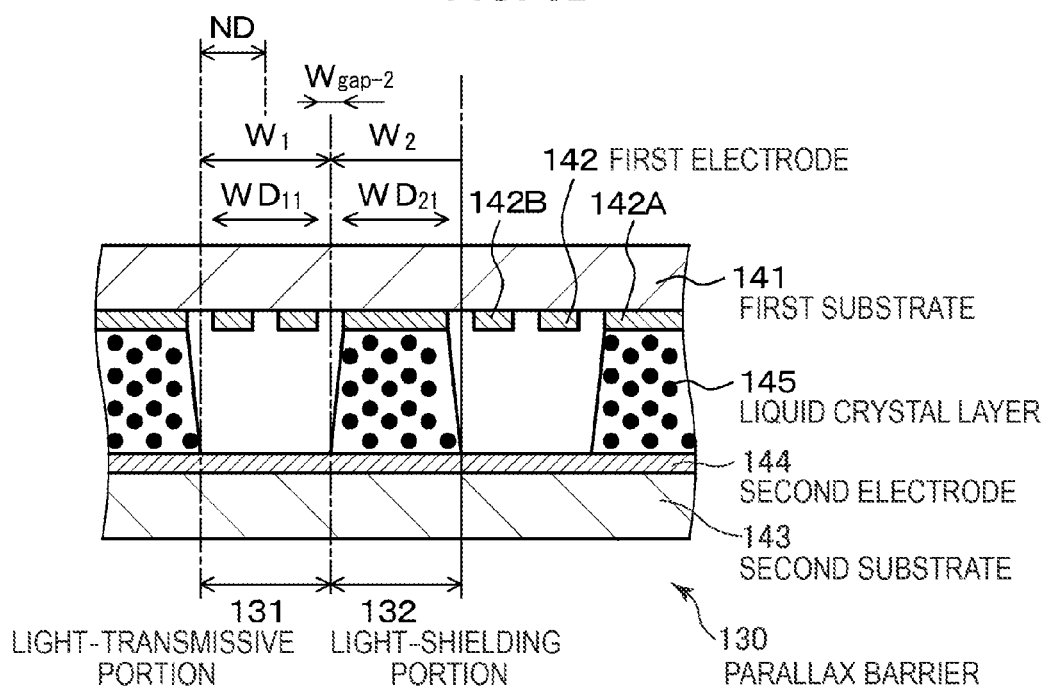
FIG. 8B is a partial schematic sectional view of a liquid crystal display device, which shows an operation state where $W_1/ND=2.0$ in the liquid crystal display device constituting the parallax barrier in the display device according to the first embodiment.

FIG. 6A shows results obtained by actually measuring a moire modulation depth of the entire white display in the back barrier display device of the first embodiment by making the width $W_1$ of the parallax barrier 130 different. FIG. 6B shows results obtained by actually measuring a moire modulation depth of the entire white display in the front barrier display device in the related art. The results obtained by actual measurement of the moire modulation depth in FIGS. 6A and 6B are effectively consistent with the results obtained by simulation in FIGS. 2A and 2B, particularly the results obtained by simulation of the moire modulation depth based on the diffraction-induced moire. In other words, it is assumed that a strong diffraction-induced moire is generated in actual display devices.

Incidentally, in the front bather mode shown in FIG. 6B, the moire is minimal in the vicinity of $W_1/ND=1.4$. However, in the transmissive display panel, moire may be generated in the vicinity of $W_1/ND=1.4$. For example, when a transmissive display panel in which a light-emitting portion of the pixel is changed in a half tone such as MVA (Multi-domain Vertical Alignment) type is used, the intensity of the shape-induced moire is changed in the half tone, and thus moire is generated. In this case, the value of $W_1/ND$ in which the moire is minimal is changed according to the gray scale, and thus it is very difficult to remove all of the moire generated in the entire gray scale in the front barrier mode. However, in the back barrier mode shown in FIG. 6A, when $W_1/ND=1.0$ or $W_1/ND=2.0$, the value of $W_1/ND$ becomes an integral multiple, thus the moire is not generated in the transmissive display panel such as MVA (Multi-domain Vertical Alignment) type in which a light-emitting portion of the pixel is changed according to the gray scale. From the description above, in the back bather mode, the moire can be removed under the following conditions regardless of the types of transmissive display panel or the display method of the half tone:

$$W_1/ND=1.0$$

and $$W_1/ND=2.0$$

According to the first embodiment, the parallax barrier 130 includes a liquid crystal display device 140. That is, as shown in partial schematic sectional views of FIGS. 7A, 7B, 8A and 8B, in the display device of the first embodiment, the parallax barrier 130 at least includes:
a first substrate 141;
a first electrode 142 formed and patterned on the first substrate 141;
a second substrate 143 disposed on an opposite side of the first substrate;
a second electrode 144 formed on the second substrate 143 to be opposed to the first electrode 142; and a liquid crystal layer 145 sandwiched between the first substrate 141 and the second substrate 143.

Figure 23A:
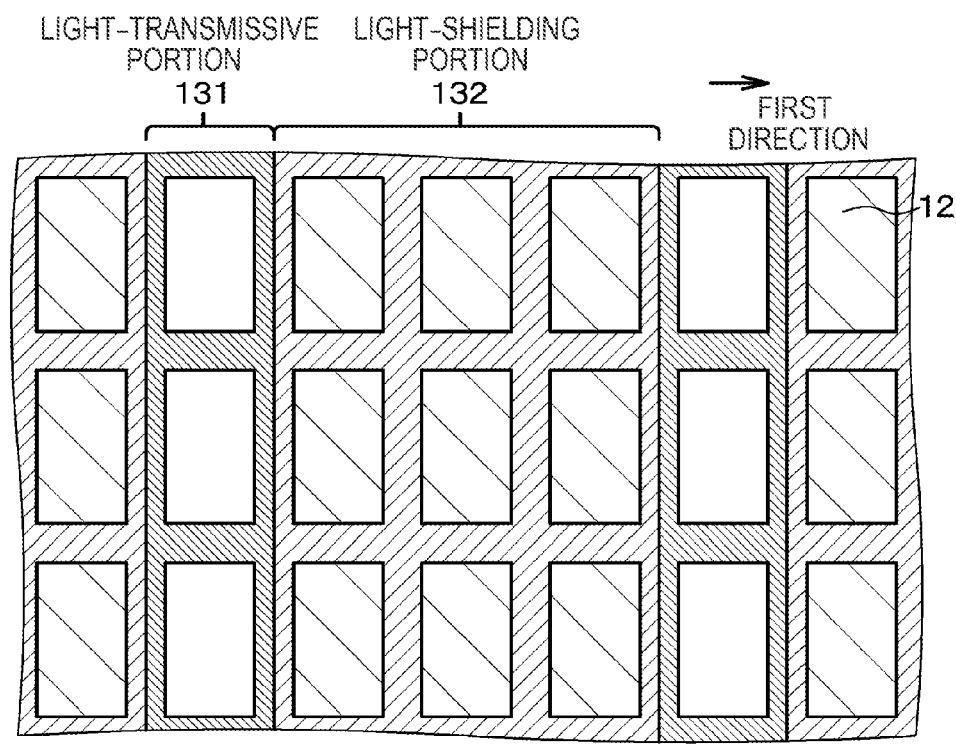
FIGS. 23A and 23B are schematic views showing an arrangement relationship between the transmissive display panel and the parallax barrier for explaining the fact that the shape-induced moire is not generated in the display device according to the embodiments of the present disclosure.
Figure 23B:
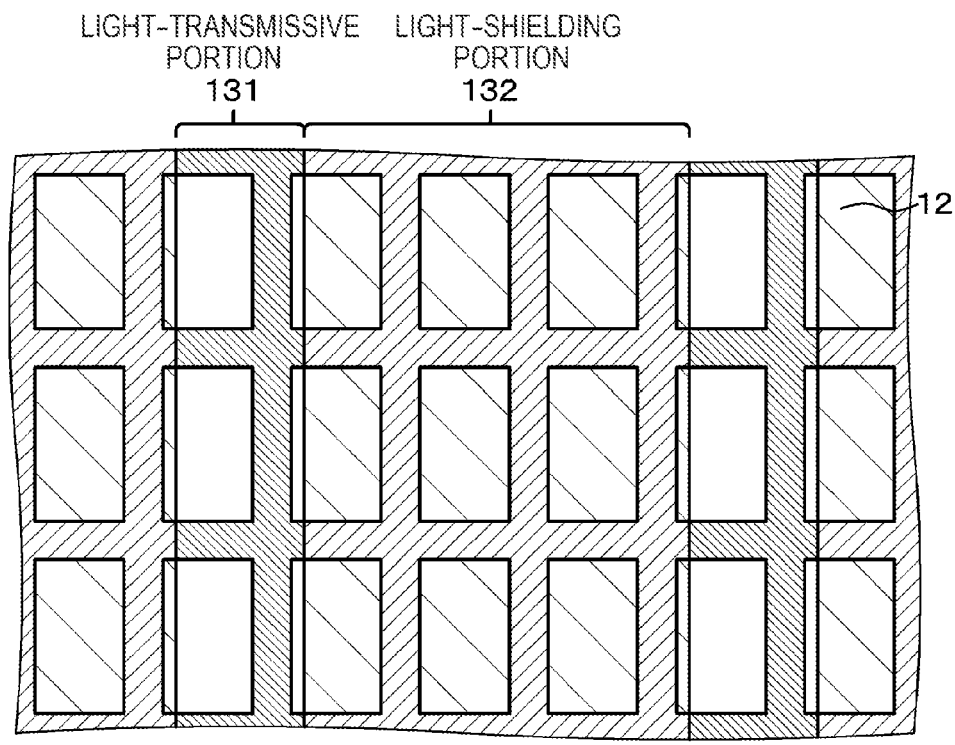
Figure 24A:
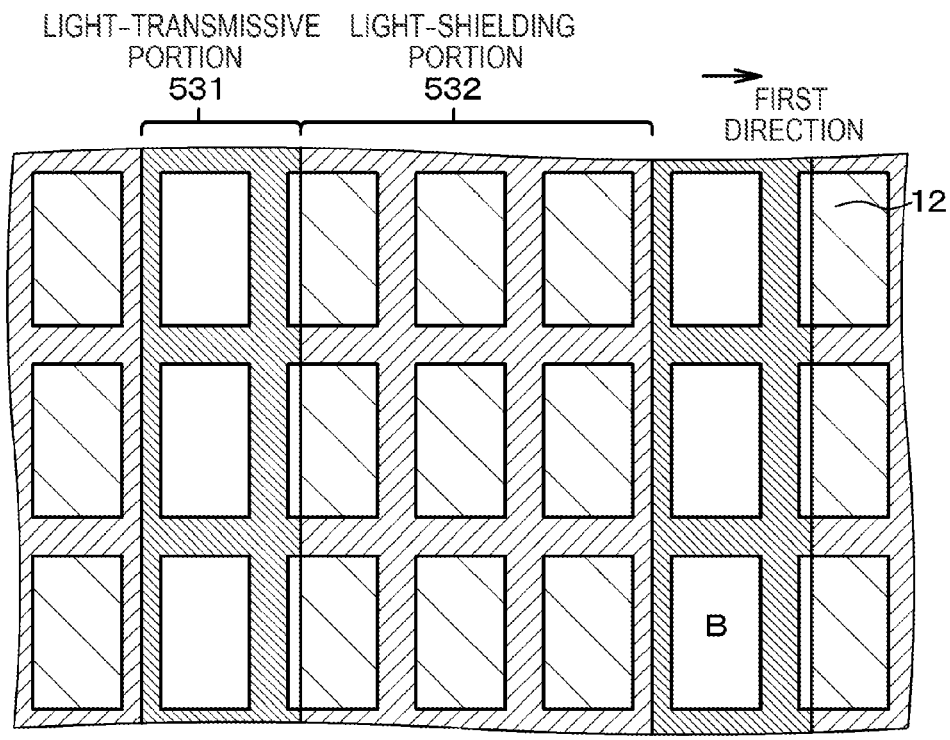
FIGS. 24A and 24B are schematic views showing an arrangement relationship between the transmissive display panel and the parallax barrier for explaining a reason why the shape-induced moire is generated in the display device in the related art.
Figure 24B:
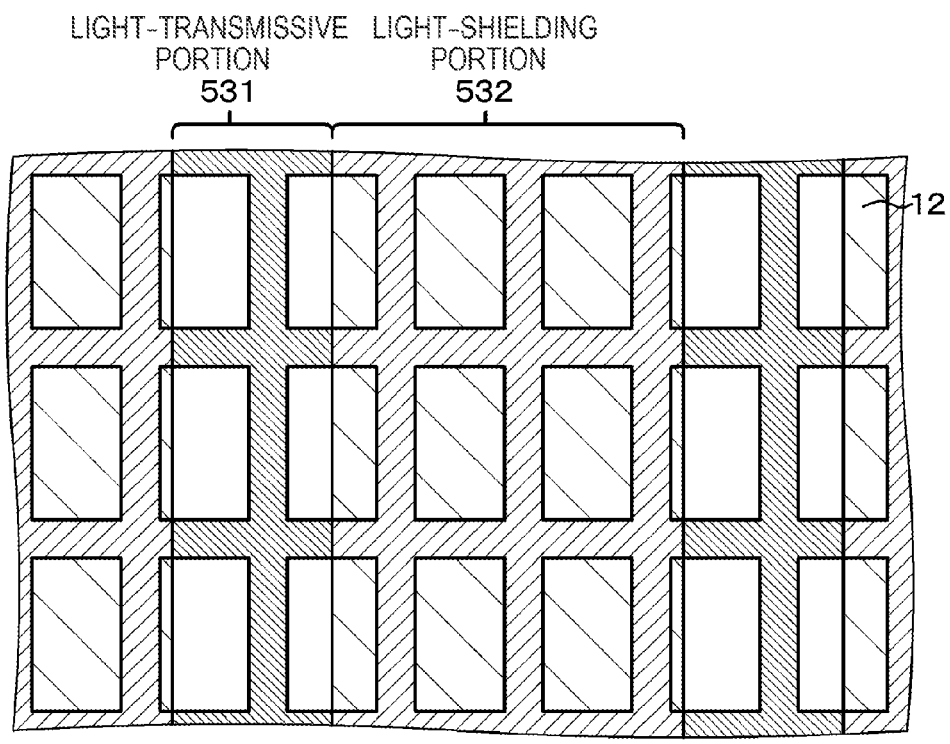
Figure 25:
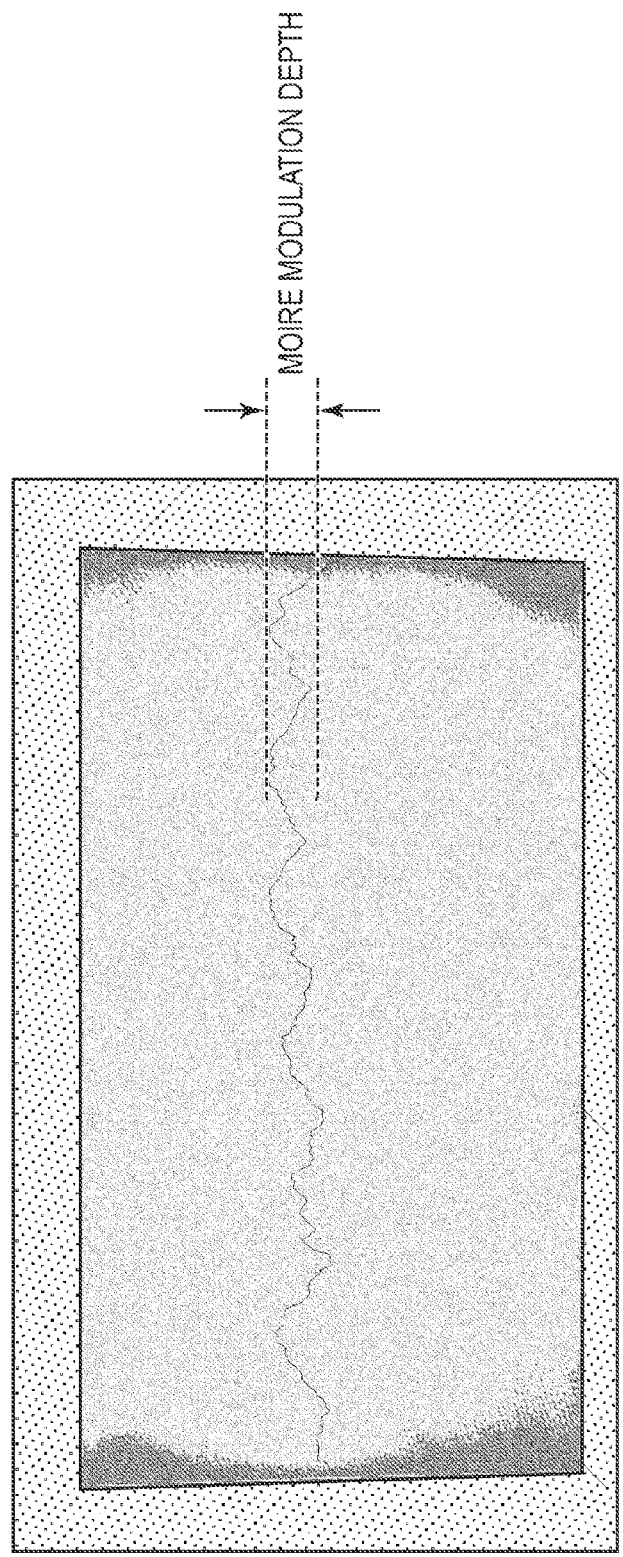
FIG. 25 is a photograph showing how moire is generated in the display device in the related art.

Arrangement relationships between pixels (sub-pixels) 12 of the transmissive display panel 10 and the light-transmissive portion 131 of the parallax barrier 130 are shown in FIGS. 23A and 23B.

The first patterned electrode 142 made of a transparent electrode material is extended in the second direction. On the other hand, the second electrode 144 made of a transparent electrode material is not patterned and is a so-called overall electrode. The configuration and structure of the liquid crystal display device 140 constituting the parallax barrier 130 is same as or similar to those of the liquid crystal display panel constituting the transmissive display panel 10, except for the configuration or structure of pixel and sub-pixel. In addition, a switching element, color filter or black matrix may not be included in the configuration.

In the liquid crystal display device 140 constituting the parallax barrier 130, a group of the light-transmissive portion 131 and light-shielding portion 132 includes one first electrode 142A forming the light-shielding portion 132 and two first electrodes 142B forming the light-transmissive portion 131. In addition, in a case where a width $W_1$ of the light-transmissive portion 131 along the first direction is substantially once as much as the pitch ND of a pixel array along the first direction (called a "first case" for convenience), the light-transmissive portion 131 is composed of one of the two first electrode 142B, and the light-shielding portion 132 is composed of one first electrode 142A and the other one of the two first electrode 142B. On the other hand, in a case where a width $W_1$ of the light-transmissive portion 131 along the first direction is substantially twice as much as the pitch ND of pixel array along the first direction (called a "second case" for convenience), the light-transmissive portion 131 is composed of two first electrode 142B, and the light-shielding portion 132 is composed of one first electrode 142A. In this regard, a width $WD_{21}$ of the first electrode 142A forming the light-shielding portion 132 along the first direction is smaller than a width $W_2$ of the light-shielding portion 132 along the first direction. Also, a width $WD_{11}$ of the first electrode 142B forming the light-transmissive portion 131 along the first direction is smaller than a width $W_1$ of the light-transmissive portion along the first direction. Specifically, in the first case, the following equations are established (see FIG. 8A):

$$W_2 - WD_{21} = 10 \ \mu m$$

and $$W_1 - WD_{11} = 10 \ \mu m$$

Also, in the second case, the following equations are established (see FIG. 8B):

$$W_2 - WD_{21} = 10 \ \mu m$$

and $$W_1 - WD_{11} = 10 \ \mu m$$

Furthermore, a gap width $W_{gap-1}$ between the first electrode 142B and the first electrode 142B and a gap width $W_{gap-2}$ between the first electrode 142A and the first electrode 142B are set to as follows, respectively:

$$W_{gap-1} = 10 \ \mu m$$

and $$W_{gap-2} = 10 \ \mu m$$

The width $W_1$ of the light-transmissive portion along the first direction is switched to any one of the following equations depending on the state of voltage applied to the first electrode 142 and the second electrode 144 (see FIGS. 8A and 8B):

$$W_1 = 1.0 \times ND$$

and $$W_1 = 2.0 \times ND$$

This switching of the width $W_1$ of the light-transmissive portion makes it possible to increase the luminance of an image displayed on the transmissive display panel 10. When no voltage is applied to the first electrode 142 and the second electrode 144, a liquid crystal layer 145 of the liquid crystal display device 140 constituting the parallax barrier 130 may be a state capable of transmitting light through the layer (normally white) or may be a state incapable of transmitting light through the layer (normally black). In addition, a two-dimensional image can be displayed in a state of the liquid crystal display device 140 shown in FIG. 7.

More specifically, as mentioned above, if the pixel pitch ND of the transmissive display panel 10 is 0.100 mm, the distance $Z_2$ is 1500 mm, and the distance DP is 65.0 mm, the distance $Z_1$ is 2.31 mm and the light-transmissive portion pitch RD is 0.400 mm. In the first case, the following equations are established:

$$W_1 = 0.100 \ mm$$

and $$W_2 = 0.300 \ mm$$

Alternatively, in the second case, the following equations are established:

$$W_1 = 0.200 \ mm$$

and $$W_2 = 0.200 \ mm$$

Thus, the following equations are established:

$$W_{11} = 0.090 \ mm$$

and $$W_{21} = 0.190 \ mm$$

Moreover, in the first embodiment, the haze value of the transmissive display panel 10 is 4%. Specifically, a film in which a roughening process is performed on a surface of a transparent film (not shown) such as PET or TAC film or particles having different refractive index are sprayed thereon may be bonded on the transmissive display panel 10.

According to the display device of the first embodiment, stereoscopic images and two-dimensional images can be displayed, or alternatively, different images can be displayed when the display device is viewed from different angles. According to the display device of the first embodiment, the parallax barrier is disposed on the rear surface of the transmissive display panel. Moreover, the width $W_1$ of the light-transmissive portion along the first direction is substantially once or twice as much as the pitch ND of pixel array along the first direction, thus it is possible to reduce the generation of the diffraction-induced moire as well as the shape-induced moire.

Second Embodiment

Figure 9:
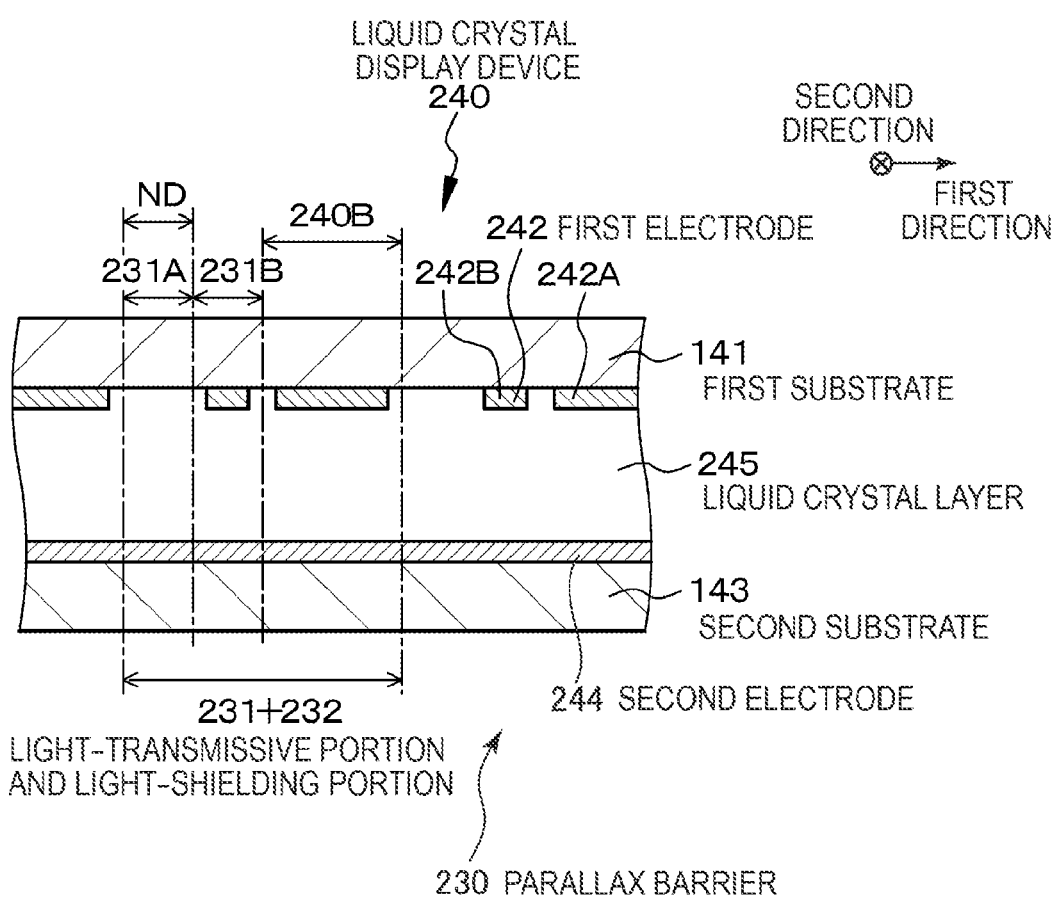
FIG. 9 is a partial schematic sectional view showing a liquid crystal display device constituting a parallax barrier according to a second embodiment of the present disclosure.
Figure 10A:
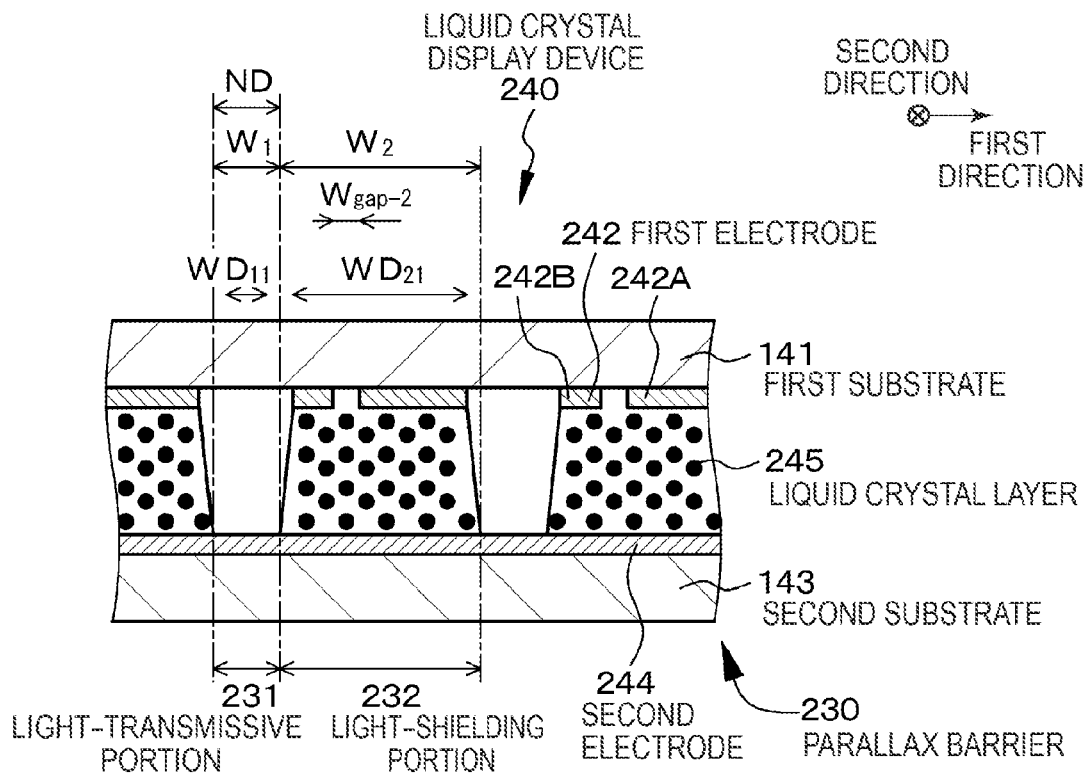
FIG. 10A is a partial schematic sectional view of a liquid crystal display device, which shows an operation state where $W_1/ND=1.0$ in the liquid crystal display device constituting the parallax barrier in the display device according to the second embodiment.
Figure 10B:
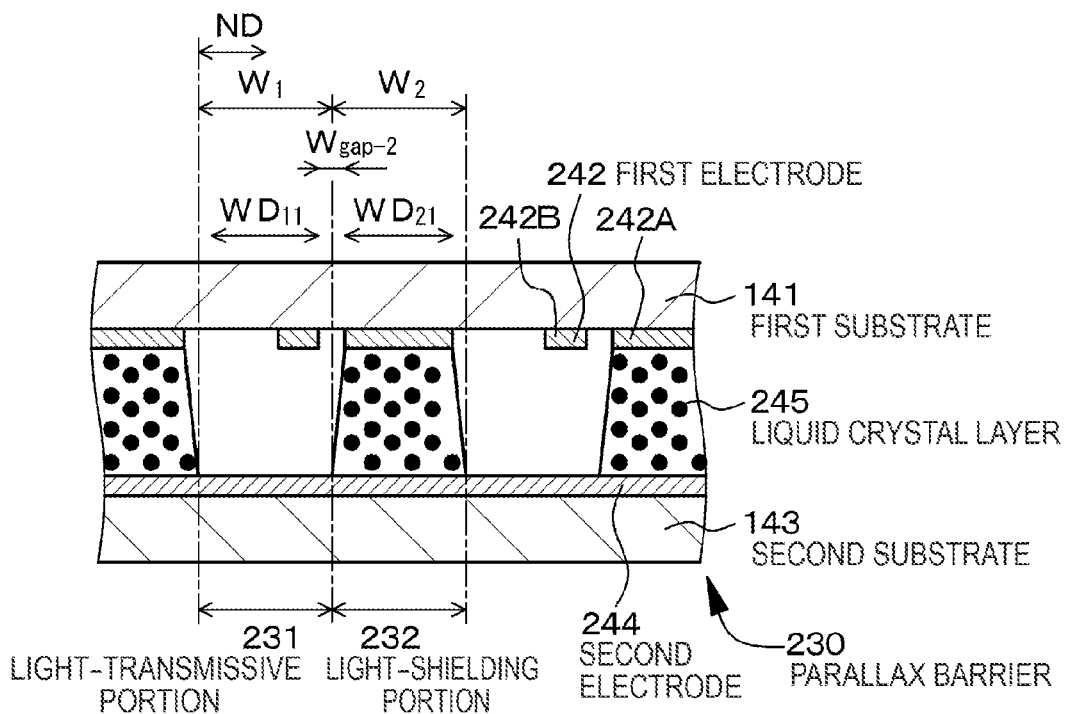
FIG. 10B is a partial schematic sectional view of a liquid crystal display device, which shows an operation state where $W_1/ND=2.0$ in the liquid crystal display device constituting the parallax barrier in the display device according to the second embodiment.

A second embodiment is a modification of the first embodiment. According to the second embodiment, as shown in FIGS. 9, 10A and 10B which illustrate partial schematic sectional views of a liquid crystal display device 240 constituting a parallax barrier 230, a first electrode 242A is formed on an area 240B of the liquid crystal display device which constitutes a light-shielding portion 232. In addition, a light-transmissive portion 231 is configured to include an area 231B on which a first electrode 242B is formed and an area 231A on which the first electrode is not formed. These two areas 231B, 231A are juxtaposed along a first direction. Further, in a case where a width $W_1$ of the light-transmissive portion 231 along the first direction is substantially once as much as the pitch ND of pixel array along the first direction (a first case), the light-transmissive portion 231 is composed of the area 231A on which the first electrode is not formed, and the light-shielding portion 232 is composed of the first electrode 242A and the first electrode 242B. On the other hand, in a case where the width $W_1$ of the light-transmissive portion 231 along the first direction is substantially twice as much as the pitch ND of pixel array along the first direction (a second case), the light-transmissive portion 231 is composed of the area 231B on which the first electrode 242B is formed and the area 231A on which the first electrode is not formed, and the light-shielding portion 232 is composed of the first electrode 242B. Note that a width $WD_{11}$ of the first electrode 242B constituting the light-transmissive portion 231 along the first direction is smaller than the width $W_1$ of the light-transmissive portion 231 along the first direction. Specifically, in the first case, the following equation is established (see FIG. 10A):

$$W_1 - WD_{11} = 10 \ \mu m$$

Also, in the second case, the following equation is established (see FIG. 10B):

$$W_1 - WD_{11} = 10 \ \mu m$$

A gap width $W_{gap-2}$ between the first electrode 242A and the first electrode 242B is same as that of the first embodiment. When no voltage is applied to the first electrode 242 and a second electrode 244, a liquid crystal layer 245 in the liquid crystal display device 240 constituting the parallax barrier 230 is a state capable of transmitting light through the layer (normally white). According to the second embodiment, the width $W_1$ of the light-transmissive portion 131 along the first direction is switched to any one of the following equations depending on the state of voltage applied to the first electrode 242 and the second electrode 244 (see FIGS. 10A and 10B):

$$W_1 = 1.0 \times ND$$

and $$W_1 = 2.0 \times ND$$

This switching of the width $W_1$ makes it possible to increase the luminance of an image displayed on the transmissive display panel 10. In addition, a two-dimensional image can be displayed in a state of the liquid crystal display device 240 shown in FIG. 9.

Third Embodiment

Figure 11A:
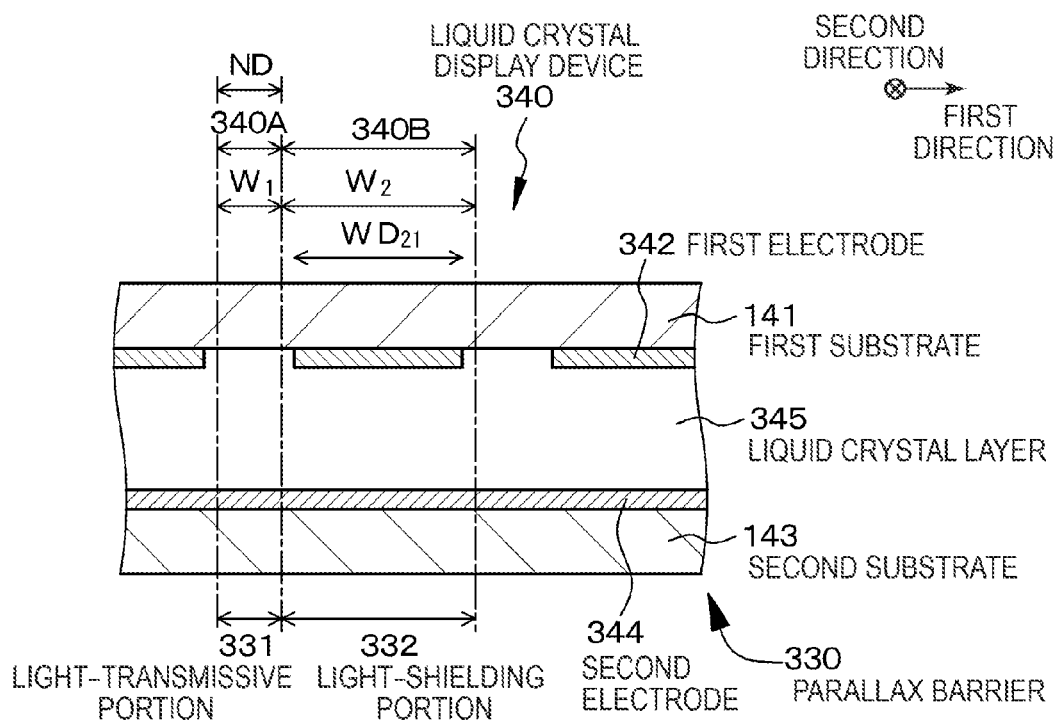
FIG. 11A is a partial schematic sectional view showing a liquid crystal display device constituting a parallax barrier according to a third embodiment of the present disclosure.
Figure 11B:
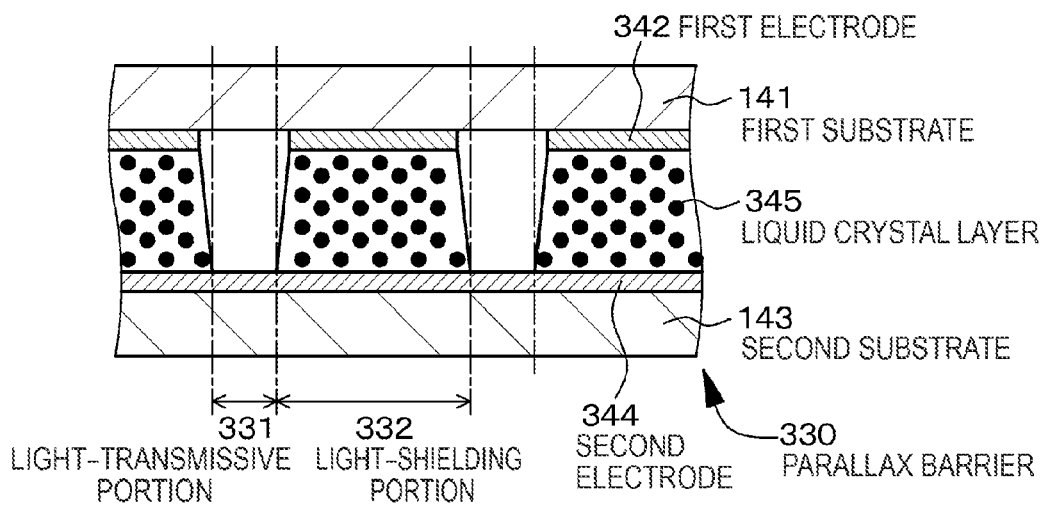
FIG. 11B is a partial schematic sectional view of a liquid crystal display device, which shows an operation state (where $W_1/ND=1.0$) of the liquid crystal display device constituting the parallax barrier.
Figure 12A:
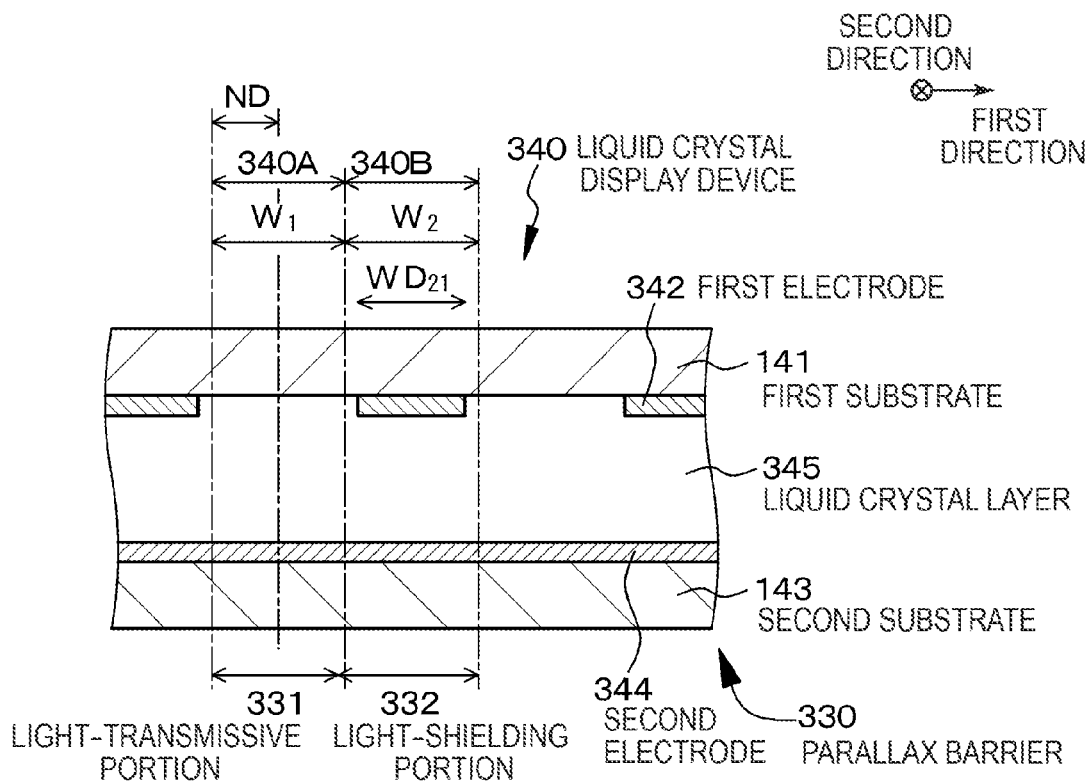
FIG. 12A is a partial schematic sectional view showing a liquid crystal display device constituting a parallax barrier in a modification of the display device according to the third embodiment.

The third embodiment is also a modification of the first embodiment. In the first and second embodiments, the $W_1$ of the light-transmissive portion 331 along the first direction is variable. On the other hand, in the third embodiment, the $W_1$ of the light-transmissive portion 331 along the first direction is fixed. Specifically, according to the display device of the third embodiment, as shown in FIGS. 11A and 12A which illustrate partial schematic sectional views of a liquid crystal display device 340 constituting a parallax barrier 330, a first electrode 342 is formed on an area 340B of the liquid crystal display device which constitutes a light-shielding portion 332, and the first electrode is not formed on an area 340A of the liquid crystal display device 340 which constitutes the light-transmissive portion 331. When no voltage is applied to the first electrode 342 and a second electrode 344, a liquid crystal layer 345 in the liquid crystal display device constituting the parallax barrier 330 is a state capable of transmitting light through the layer (normally white). As shown in FIG. 11B, the width of the light-transmissive portion 331 is set to 0.100 mm, and the gap width between the first electrode 342 and the first electrode 342 is set to 0.110 mm, thereby obtaining the following equation:

$$W_1 = 1.0 \times ND$$

Figure 12B:
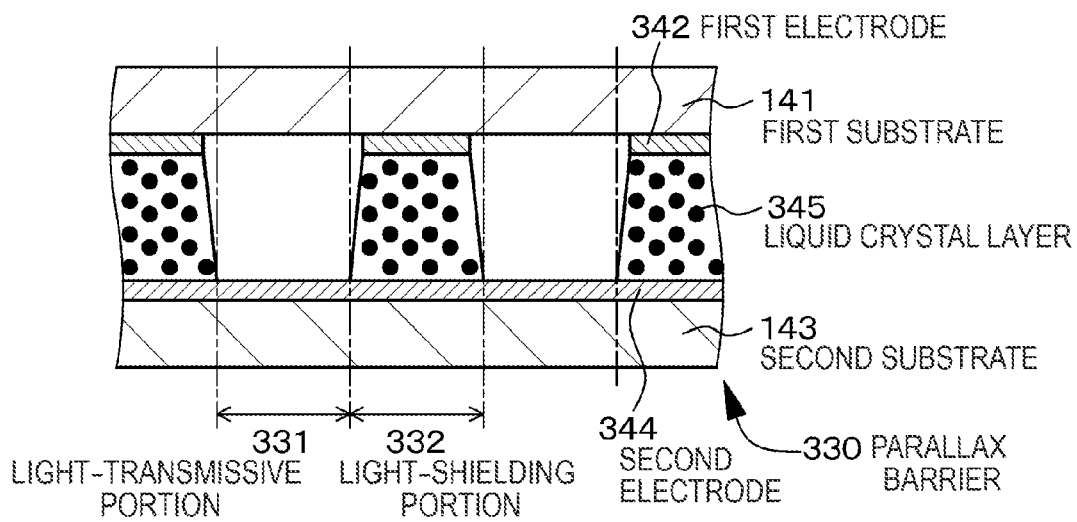
FIG. 12B is a partial schematic sectional view of a liquid crystal display device, which shows an operation state (where $W_1/ND=2.0$) of the liquid crystal display device constituting the parallax barrier.

On the other hand, as shown in FIG. 12B, the width of the light-transmissive portion 331 is set to 0.200 mm, and the gap width between the first electrode 342 and the first electrode 342 is set to 0.210 mm, thereby obtaining the following equation:

$$W_1 = 2.0 \times ND$$

In addition, a two-dimensional image can be displayed in a state of the liquid crystal display device 340 shown in FIGS. 11A and 12A.

Fourth Embodiment

Figure 14:
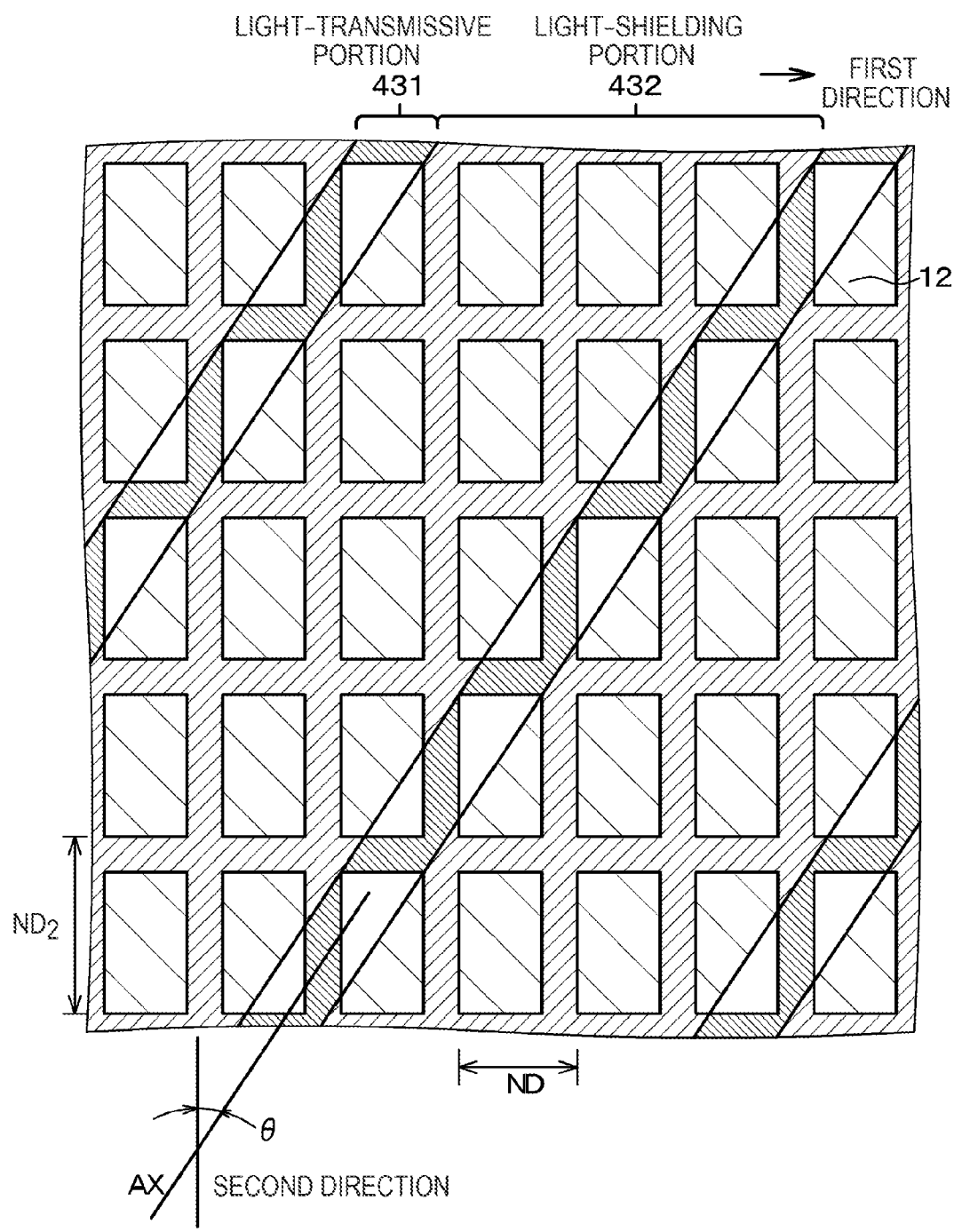
FIG. 14 is a schematic view showing an arrangement relationship between a transmissive display panel and a parallax barrier in the display device according to the fourth embodiment.
Figure 15:
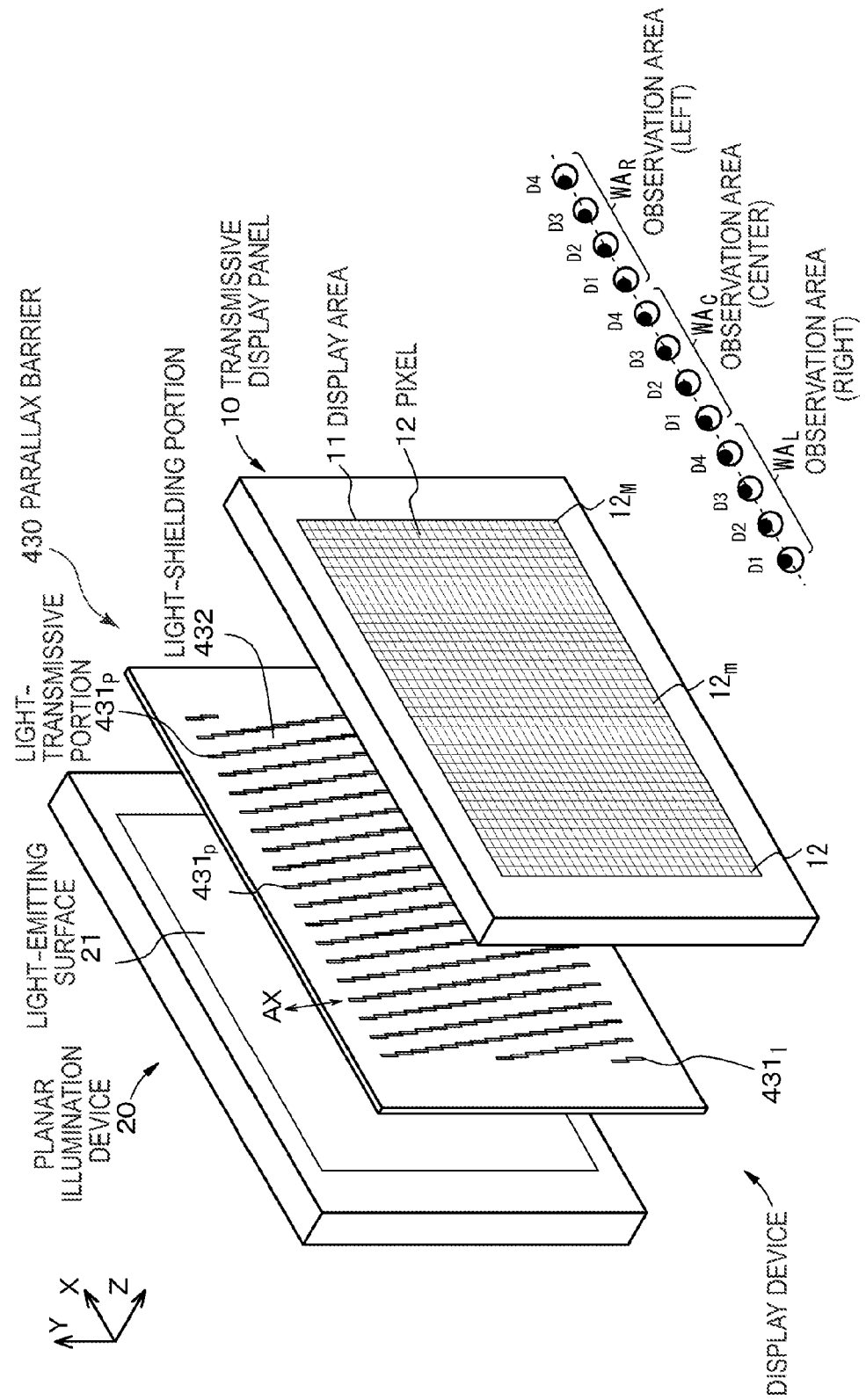
FIG. 15 is a schematic perspective view showing a virtually exploded state of a modification of the display device according to the fourth embodiment.

The fourth embodiment is a modification of the first to third embodiments. A schematic perspective view showing a virtually exploded state of the display device according to the fourth embodiment is shown in FIG. 13. In addition, a schematic view showing an arrangement relationship between the transmissive display panel 10 and a parallax barrier 430 in a display device according to the fourth embodiment is shown in FIG. 14. Furthermore, a schematic perspective view showing a virtually exploded state of a modification of the display device according to the fourth embodiment is shown in FIG. 15.

In the fourth embodiment, an angle θ formed between an axis AX of the parallax barrier 430 and the second direction is an acute angle. When the array pitch of pixels 12 along the second direction is $ND_2$, light-transmissive portion 431 of the parallax barrier 430 and light-shielding portion 432 satisfy the following equation:

$$\theta = \tan^{-1}(ND_2/ND)$$

By this equation, the positional relationship between each pixel 12 and the light-transmissive portions 431 of the parallel barrier 430 which is opposite to each pixel is normally constant along the axis AX of the parallax barrier 430, thus it is possible to prevent crosstalk from being generated when stereoscopic images are displayed, thereby realizing a high quality stereoscopic display. As shown in FIGS. 13 and 14, the light-transmissive portion 431 constituting the parallax barrier 430 can be configured to be arranged in a straight line along the axis AX of the parallax barrier 430. Alternatively, as shown in FIG. 15, the light-transmissive portion 431 constituting the parallax barrier 430 can be configured to be arranged in a stepwise manner along the axis AX of the parallax barrier 430. That is, the pinhole shaped light-transmissive portions (apertures) are continuously arranged in an oblique manner, and thus the light-transmissive portions 431 can be configured to be extended obliquely as a whole.

Although the present disclosure has been described with reference to some preferred embodiments, the present disclosure is not limited to those embodiments. The configurations and structures of the transmissive display panel, the planar illumination device, and parallax barrier described in the embodiments are illustrative only and can be readily modified. The width of black matrix along the first direction is formed so that wide widths are alternated with narrow widths, for example, wide, narrow, wide, narrow, etc., that is, a wide width is formed every two sub-pixels, thus there is provided with a transmissive display panel having such a black matrix formed thereon. In other words, the black matrix has a periodic structure of two sub-pixels. In the display device including such a transmissive display panel, when the width of the light-transmissive portion along the first direction is $W_1$ and the pitch of pixel array along the first direction is ND, the following condition may be satisfied:

$$1.9 \times ND \leq W_1 \leq 2.1 \times ND$$

Additionally, the present technology may also be configured as below.

(1) <Display Device>

A display device including:

a transmissive display panel composed of pixels arranged in a form of a two-dimensional matrix in a first direction and a second direction different from the first direction;

a planar illumination device for illuminating the transmissive display panel from a rear surface thereof; and a parallax barrier disposed between the transmissive display panel and the planar illumination device, for dividing an image displayed on the transmissive display panel into images for multiple viewpoints, wherein the parallax barrier and the transmissive display panel are arranged opposite to each other with a predetermined gap therebetween, wherein the parallax barrier includes a plurality of light-transmissive portions and light-shielding portions, the light-transmissive portions and light-shielding portions extending along an axis parallel to the second direction or an axis forming an acute angle with the second direction and being alternately juxtaposed along the first direction, and wherein one of the following equations is satisfied $$0.95 \times ND \leq W_1 \leq 1.05 \times ND$$

or $$1.9 \times ND \leq W_1 \leq 2.1 \times ND$$

where $W_1$ represents a width of the light-transmissive portions along the first direction, and where ND is a pixel array pitch along the first direction.

(2) The display device according to (1), wherein the parallax barrier is composed of a liquid crystal display device including at least:

a first substrate;

a first electrode formed and patterned on the first substrate;

a second substrate disposed opposite to the first substrate;

a second electrode formed on the second substrate to be opposed to the first electrode; and a liquid crystal layer sandwiched between the first substrate and the second substrate.

(3) The display device according to (2), wherein a width of the first electrode constituting the light-shielding portions along the first direction is smaller than a width of the light-shielding portions along the first direction.

(4) The display device according to (3), wherein a width of the first electrode constituting the light-transmissive portions along the first direction is smaller than the width $W_1$ of the light-transmissive portions along the first direction.

(5) The display device according to any one of (2) to (4), wherein the width $W_1$ of the light-transmissive portions along the first direction is switched to one of the following conditions depending on a state of voltage applied to the first electrode and the second electrode $$0.95 \times ND \leq W_1 \leq 1.05 \times ND$$

or $$1.9 \times ND \leq W_1 \leq 2.1 \times ND.$$

(6) The display device according to (2), wherein the first electrode is formed on an area of the liquid crystal display device constituting the light-shielding portions, and wherein the first electrode is not formed on an area of the liquid crystal display device constituting the light-transmissive portions.

(7) The display device according to (2), wherein the first electrode is formed on an area of the liquid crystal display device constituting the light-shielding portions, wherein the light-transmissive portions are provided with an area where the first electrode is formed and an area where the first electrode is not formed, the both areas being juxtaposed along the first direction, and wherein a width of the first electrode constituting the light-transmissive portions along the first direction is smaller than the width $W_1$ of the light-transmissive portions along the first direction.

(8) The display device according to (7), wherein the width $W_1$ of the light-transmissive portions along the first direction is switched to one of the following conditions depending on a state of voltage applied to the first electrode and the second electrode $$0.95 \times ND \leq W_1 \leq 1.05 \times ND$$

or $$1.9 \times ND \leq W_1 \leq 2.1 \times ND.$$

(9) The display device according to any one of (2) to (8), wherein a haze value of the transmissive display panel is 15% or less.

(10) The display device according to any one of (1) to (9), wherein an angle θ formed between an axis of the parallax barrier and the second direction is an acute angle, and wherein the following equation is satisfied $$\theta = \tan^{-1}(ND_2/ND)$$

where $ND_2$ is a pixel array pitch along the second direction.

(11) The display device according to any one of (1) to (10), wherein an angle θ formed between an axis of the parallax barrier and the second direction is an acute angle, and wherein the light-transmissive portions constituting the parallax barrier are linearly arranged along the axis of the parallax barrier.

(12) The display device according to any one of (1) to (10), wherein an angle θ formed between an axis of the parallax barrier and the second direction is an acute angle, and wherein the light-transmissive portions constituting the parallax barrier are arranged in a stepwise manner along the axis of the parallax barrier.

(13) A display device including:

a transmissive display panel;

an illumination device; and a parallax barrier, wherein the parallax barrier is disposed between the transmissive display panel and the illumination device, and includes a plurality of light-transmissive portions and a plurality of light-shielding portions, the light-transmissive portions and light-shielding portions being juxtaposed along a first direction, and wherein one of the following conditions is satisfied $$0.95 \times ND \leq W_1 \leq 1.05 \times ND$$

or $$1.9 \times ND \leq W_1 \leq 2.1 \times ND$$

where $W_1$ represents a width of the light-transmissive portions along the first direction, and where ND represents a pixel array pitch along the first direction.

(14) The display device according to (13),
wherein the parallax barrier at least includes:
a first substrate;
a first electrode formed and patterned on the first substrate;
a second substrate disposed opposite to the first substrate;
a second electrode formed on the second substrate to be opposed to the first electrode; and
a liquid crystal layer sandwiched between the first substrate and the second substrate,
wherein the width $W_1$ of the light-transmissive portions along the first direction is switched to one of the following conditions depending on a state of voltage applied to the first electrode and the second electrode $$0.95 \times ND \leq W_1 \leq 1.05 \times ND$$

or $$1.9 \times ND \leq W_1 \leq 2.1 \times ND.$$

(15) The display device according to (14),
wherein the illumination device includes a light source and a diffusion member, and
wherein an image displayed on the transmissive display panel is divided into images for multiple viewpoints by a portion of light passing through the parallax bather, the portion of light being diffused through the diffusion member.

The present disclosure contains subject matter related to that disclosed in Japanese Priority Patent Application JP 2012-000623 filed in the Japan Patent Office on Jan. 5, 2012, the entire content of which is hereby incorporated by reference.

What is claimed is:
1. A display device comprising:
a transmissive display panel composed of pixels arranged in a form of a two-dimensional matrix in a first direction and a second direction different from the first direction;
a planar illumination device for illuminating the transmissive display panel from a rear surface thereof; and
a parallax barrier disposed between the transmissive display panel and the planar illumination device, for manipulating light such that an image displayed on the transmissive display panel has an appearance of being divided into images for multiple viewpoints,
wherein the parallax barrier and the transmissive display panel are arranged opposite to each other with a predetermined gap therebetween,
wherein the parallax barrier includes a plurality of light-transmissive portions and light-shielding portions, the light-transmissive portions and light-shielding portions extending along an axis parallel to the second direction or an axis forming an acute angle with the second direction and being alternately juxtaposed along the first direction, and wherein one of the following equations is satisfied $$0.95 \times ND \leq W_1 \leq 1.05 \times ND$$

or $$1.9 \times ND \leq W_1 \leq 2.1 \times ND$$

where $W_1$ represents a width of the light-transmissive portions along the first direction, and where ND is a pixel array pitch along the first direction;
wherein the parallax barrier is composed of a liquid crystal display device including at least:
a first substrate;
a first electrode formed and patterned on the first substrate;
a second substrate disposed opposite to the first substrate;
a second electrode formed on the second substrate to be opposed to the first electrode; and
a liquid crystal layer sandwiched between the first substrate and the second substrate; and
wherein the first electrode is formed on an area of the liquid crystal display device constituting the light-shielding portions; and
wherein the first electrode is not formed on an area of the liquid crystal display device constituting the light-transmissive portions.

2. The display device according to claim 1, wherein a width of the first electrode constituting the light-shielding portions along the first direction is smaller than a width of the light-shielding portions along the first direction.

3. The display device according to claim 2, wherein a width of the first electrode constituting the light-transmissive portions along the first direction is smaller than the width $W_1$ of the light-transmissive portions along the first direction.

4. The display device according to claim 3, wherein the width $W_1$ of the light-transmissive portions along the first direction is switched to one of the following conditions depending on a state of voltage applied to the first electrode and the second electrode $$0.95 \times ND \leq W_1 \leq 1.05 \times ND$$

or $$1.9 \times ND \leq W_1 \leq 2.1 \times ND.$$

5. The display device according to claim 1,
wherein the first electrode is formed on an area of the liquid crystal display device constituting the light-shielding portions,
wherein the light-transmissive portions are provided with an area where the first electrode is formed and an area where the first electrode is not formed, the both areas being juxtaposed along the first direction, and
wherein a width of the first electrode constituting the light-transmissive portions along the first direction is smaller than the width $W_1$ of the light-transmissive portions along the first direction.

6. The display device according to claim 5, wherein the width $W_1$ of the light-transmissive portions along the first direction is switched to one of the following conditions depending on a state of voltage applied to the first electrode and the second electrode $$0.95 \times ND \leq W_1 \leq 1.05 \times ND$$

or $$1.9 \times ND \leq W_1 \leq 2.1 \times ND.$$

7. The display device according to claim 1, wherein a haze value of the transmissive display panel is 15% or less.

8. The display device according to claim 1,
wherein an angle θ formed between an axis of the parallax barrier and the second direction is an acute angle, and
wherein the light-transmissive portions constituting the parallax barrier are linearly arranged along the axis of the parallax barrier.

9. The display device according to claim 1,
wherein an angle θ formed between an axis of the parallax barrier and the second direction is an acute angle, and
wherein the light-transmissive portions constituting the parallax barrier are arranged in a stepwise manner along the axis of the parallax barrier.

* * * * *